US009454869B1

(12) United States Patent
Martuch

(10) Patent No.: US 9,454,869 B1
(45) Date of Patent: Sep. 27, 2016

(54) VENDING SYSTEM WITH RECYCLABLE PACKAGING HAVING AUTOMATED DEPOSIT AND RETURN

(71) Applicant: Michael Martuch, Rockledge, FL (US)

(72) Inventor: Michael Martuch, Rockledge, FL (US)

( * ) Notice: Subject to any disclaimer, the term of this patent is extended or adjusted under 35 U.S.C. 154(b) by 0 days.

(21) Appl. No.: 14/984,583

(22) Filed: Dec. 30, 2015

Related U.S. Application Data

(62) Division of application No. 14/157,862, filed on Jan. 17, 2014, now Pat. No. 9,245,404.

(60) Provisional application No. 61/753,590, filed on Jan. 17, 2013.

(51) Int. Cl.

| | |
|---|---|
| ***B65G 47/14*** | (2006.01) |
| ***B65G 59/00*** | (2006.01) |
| ***G07F 11/00*** | (2006.01) |
| ***G07F 11/72*** | (2006.01) |
| ***G07F 7/06*** | (2006.01) |
| ***G07F 7/00*** | (2006.01) |

(52) U.S. Cl.
CPC ............... *G07F 11/72* (2013.01); *G07F 7/005* (2013.01); *G07F 7/06* (2013.01); *G07F 7/0609* (2013.01)

(58) Field of Classification Search
CPC .......... G07F 7/005; G07F 11/72; G07F 7/06; G07F 7/00; G07G 7/06
USPC ............ 221/1, 2, 82; 235/375, 454; 186/52; 194/209, 212, 205; 700/237
See application file for complete search history.

(56) References Cited

U.S. PATENT DOCUMENTS

| | | | | |
|---|---|---|---|---|
| 4,013,930 | A | 3/1977 | Geller | |
| 4,579,216 | A * | 4/1986 | DeWoolfson | G07F 7/0609 100/902 |
| 4,653,627 | A | 3/1987 | Hampson | |
| 5,233,167 | A | 8/1993 | Markman | |
| 5,335,818 | A * | 8/1994 | Maldanis | G07F 11/24 221/131 |
| 5,475,367 | A | 12/1995 | Prevost | |
| 5,692,836 | A * | 12/1997 | Mitchell | B65F 1/062 383/22 |
| 5,842,188 | A | 11/1998 | Ramsey | |
| 6,137,414 | A | 10/2000 | Federman | |
| 6,255,958 | B1 | 7/2001 | Haimovich | |
| 6,454,324 | B1 | 9/2002 | Lewis | |
| 8,289,168 | B2 | 10/2012 | Liu | |
| 8,387,771 | B2 * | 3/2013 | Boydston | G07F 7/0609 194/205 |
| 9,245,404 | B1 * | 1/2016 | Martuch | B60P 1/6454 |
| 2003/0132289 | A1 | 7/2003 | Jacobi | |
| 2003/0170529 | A1 | 9/2003 | Sagawa | |
| 2006/0074524 | A1 * | 4/2006 | Chirnomas | B65G 57/302 700/242 |
| 2007/0151981 | A1 | 7/2007 | Halsey et al. | |
| 2009/0140000 | A1 | 6/2009 | Davis, Jr. | |
| 2010/0044448 | A1 | 2/2010 | Wolfson | |

(Continued)

*Primary Examiner* — Rakesh Kumar
(74) *Attorney, Agent, or Firm* — Brian S. Steinberger; Law Offices of Brian S. Steinberger, P.A.

(57) ABSTRACT

Vending machines and dispensers, devices, apparatus, systems, and methods of providing and using a vending machine that dispenses goods in recyclable and reusable packaging having automated deposits and returns for the packaging. Customers purchase items such as products, goods, liquids and gasses in reusable containers having electronic tags from automated vending machines. Customers pay for the items at time of purchase along with an extra money deposit fee for using the reusable container. Electronic activator tags fixably attached reusable containers are detected when the containers are returned which triggers a sensor allowing for the deposits to be returned to the customer.

12 Claims, 22 Drawing Sheets

(56) References Cited

U.S. PATENT DOCUMENTS

2011/0133893 A1* 6/2011 Only A Chief ........ B42D 15/00
340/10.1
2012/0173014 A1* 7/2012 Morishita ................. B08B 3/02
700/224
2014/0365381 A1* 12/2014 Borowski .............. G06Q 10/30
705/308

* cited by examiner

FIG. 36 Vending Steps of Dispensing Unit

600

1 PLC CHECKS TO SEE THAT
a. at least one rack has a product
b. no item is in delivery area(chamber) 40
c. delivery door 30 is closed

2. IF ALL OF THE ABOVE AND POSITIVE, THE UNIT MONEY ACCEPTOR IS AUTHORIZED TO ACCEPT PAYMENT 80

3. UPON DEPOSIT OF TOTAL OF SALES PRICE AND DEPOSIT AMOUNT, A PRODUCT DELIVERY IS AUTHORIZED AND THE ASSIGNED MOTOR 180 IS TURNED ON

4. PRODUCT 50 IN CONTAINER 60 IS MOVED FORWARD BY PUSH PLATE 160 UNTIL IT FALLS INTO DELIVERY AREA AND TRIPS DELIVERY SENSORS 240A/240B WHICH STOPS MOTOR 180

5. AFTER PRODUCT 50 IN CONTAINER 60 IS REMOVED. AND SENSOR 240A/240B ARE OPEN UNIT 10 IS READY TO BEGIN NEW CYCLE

6. WHEN ANY RACK 150 IS DETERMINED TO BE EMPTY PER PLATE 220 TRIPPING SENSOR 230A/230B, THE UNIT SHIFTS TO THE NEXT DELIVERY LEVEL

FIG. 37 Recycling Steps of Return Unit

500

OPEN DOOR 90

INSERT PACKAGE 60

CLOSE DOOR 90

PUSH BUTTON(SWITCH) TO BEGIN CYCLE

DOOR 90 IS LOCKED BY SENSORS 310A/310B

SENSORS 100 and 260A/260B ARE ACTIVATED TO CONFIRM THAT BOTH TAG 70 AND CONTAINER 60 ARE IN CHAMBER 265

IF ONE OR BOTH SENSORS ARE NOT POSITIVE DOOR 90 IS UNLOCKED, SENSORS 310A/310B ARE REMOVE PRODUCT LIGHT IN CONSOLE 110 IS ACTIVATED

IF BOTH SENSORS ARE POSITIVE, TRAP DOOR 280 OPENS UNIT CONTAINER 60 FALLS PAST SENSORS 330A/330B

WHEN CONTAINER FALLS PAST SENSORS 330A/330B DOOR REVERSES DIRECTION AND CLOSES

ALSO WHEN CONTAINER FALLS PAS SENSORS 330A/330B, THE AMOUNT OF DEPOSIT IF REFUNDED

WHEN DOOR 280 IS CLOSED PER SENSOR 320A/320B, DOOR 90 IS UNLOCKED AND UNIT IS READY TO RECYCLE AGAIN

VENDING SYSTEM WITH RECYCLABLE PACKAGING HAVING AUTOMATED DEPOSIT AND RETURN

This application is a Divisional of U.S. patent application Ser. No. 14/157,862 filed Jan. 17, 2014, now allowed, which claims the benefit of priority to U.S. Provisional Patent Application Ser. No. 61/753,590 filed Jan. 17, 2013, which is incorporated by reference in its' entirety.

FIELD OF INVENTION

This invention relates to vending machines, in particular to devices, apparatus, systems, machines and methods of providing a vending machine that dispenses goods, products, items in recyclable and reusable packaging having automated deposits and returns for the packaging.

BACKGROUND AND PRIOR ART

Vending machines have been around for many years and been used for dispensing many types of goods and items. Generally, a consumer prepays with coins, bills and credit cards and receives their product. These prior art types of vending machines only sell and dispense the product and do not allow for returning the product packaging. Probably the most popular types of vending machines dispense beverages, such as soda and water in the like in aluminum cans and plastic bottles. While the beverage containers such as cans and bottles, may be recyclable. Current reverse vending machines use bar codes to verify the product which requires either exact placement of the article being returned or a mechanism to align the article with a bar code reader.

Still furthermore, current vending machines do not have the capability to refund any monies to the consumer. The consumer usually must recycle the used containers on their own, by depositing them in separate refuse holders that are labeled for recycling or placing the containers in separate recyclable bins for trash pickup.

Other types of goods have often used packaging material that is generally not easily recyclable. For example, bundles of loose goods, such as firewood, are often sold by wrapping the firewood in plastic wrapping. The plastic wrapping is often thrown away and often becomes loose trash. Many public parks are starting to ban the selling of plastic wrapped firewood as being a trash nuisance. Still furthermore, plastic wrapping material does not quickly decompose and often ends up in landfills, and the like, for many years.

Thus, the need exists for solutions to the above problems with the prior art.

SUMMARY OF THE INVENTION

A primary objective of the present invention is to provide devices, apparatus, systems, machines and methods of using a vending machine that dispenses goods in recyclable and reusable packaging having automated deposits and returns for the packaging.

A secondary objective of the present invention is to provide devices, apparatus, systems, machines and methods of using a vending machine that allows for consumers to return used containers after the contents of the containers have been depleted.

A third objective of the present invention is to provide devices, apparatus, systems, machines and methods of using a vending machine that refunds deposits back to consumers when a used container has been returned.

A fourth objective of the present invention is to eliminate plastic wrapping about bundles of goods, such as firewood being sold retail.

A fifth objective of the present invention is to provide recyclable and reusable packaging for selling bundles of goods, such as firewood.

The invention can include a product dispensing unit and a container and deposit return unit. The dispensing unit can include a money receiving portion and a vending portion that dispenses goods in recyclable and reusable packaging having automated deposits and returns for the packaging. The packaging can have security tags fixably attached so that the consumer can get their deposit bag when the empty packaging is returned.

The dispensing unit can include plural stacked support rails and tracks stacked on one another, each having a drive system. Each drive system can include a motor with pickup reel, a belt, a roller and push plate. The belt is attached to the pickup reel and runs to the front of the rack around the roller and is then attached to the push plate. When a customer makes a payment, the motor is engaged, the strap is drawn toward the motor causing the push plate to advance. Any product (in packaging with a security tag) on the rack will be moved forward with the motion of the push plate. Any product at the end of the rack can be dropped into a bin and be retrieved by a consumer opening a retrieval door.

Once the consumer is finished with the contents of the packaging, the consumer can return the empty packaging with security tag to a retrieval drawer or door on a returning unit. A sensor can detect the security tag on the returned packaging and then dispense a refund to the consumer. The returning unit can have an access door for servicing the unit when it has become full of returning packaging, Further objects and advantages of this invention will be apparent from the following detailed description of the presently preferred embodiments which are illustrated schematically in the accompanying drawings.

BRIEF DESCRIPTION OF THE FIGURES

FIG. 36 is a flowchart of the vending steps of the dispensing unit.

FIG. 37 is a flowchart of the recycling steps of the return unit.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

A list of the components will now be described.

Figure 2:
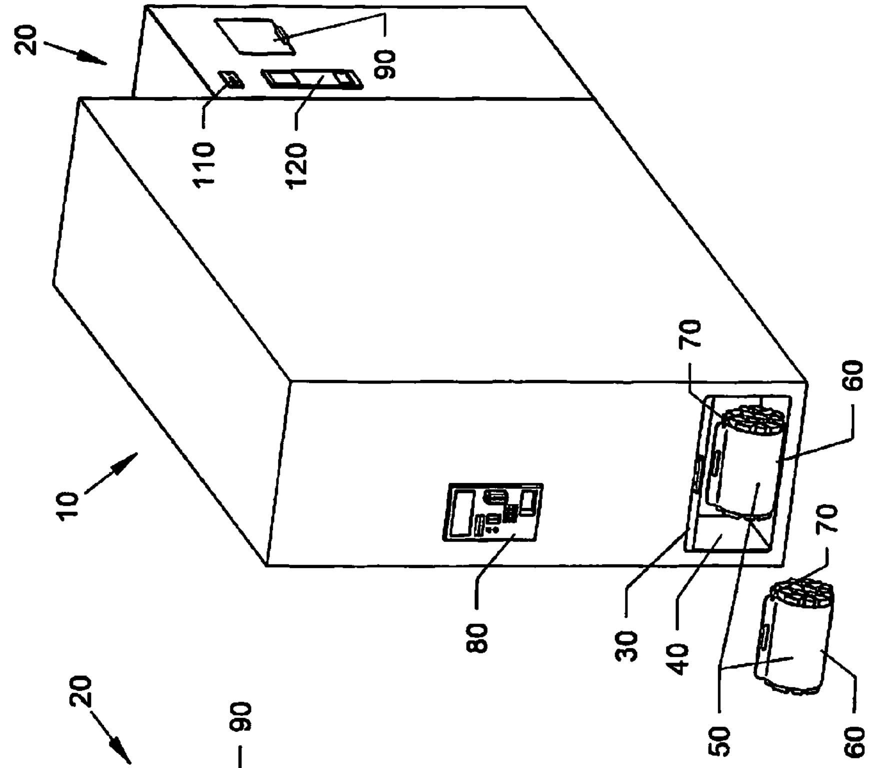
FIG. 2 is another perspective view of the dispensing unit and deposit return unit of FIG. 1 with the product dispensing door open.
Figure 1:
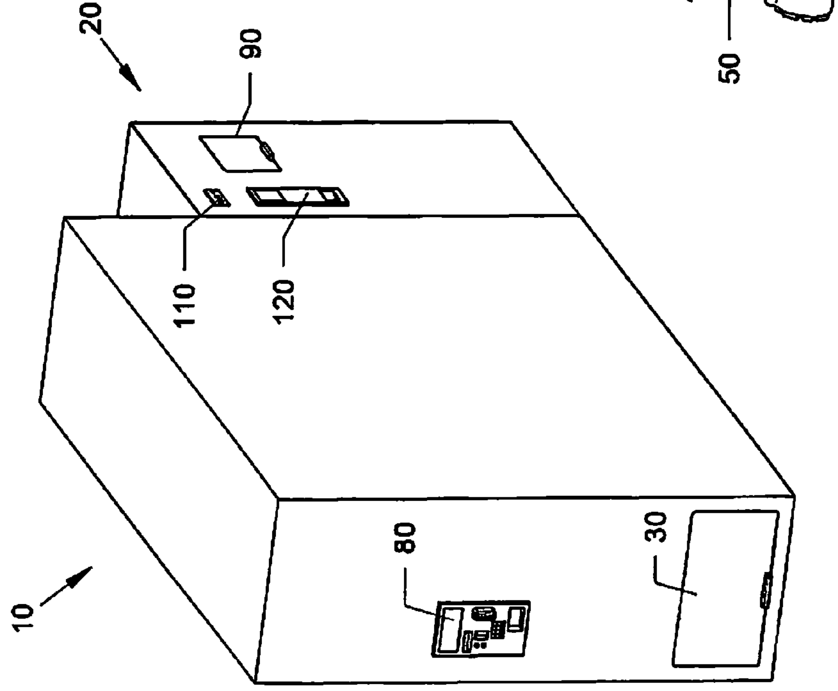
FIG. 1 is a perspective of the novel dispensing unit and deposit return unit.
Figure 5:
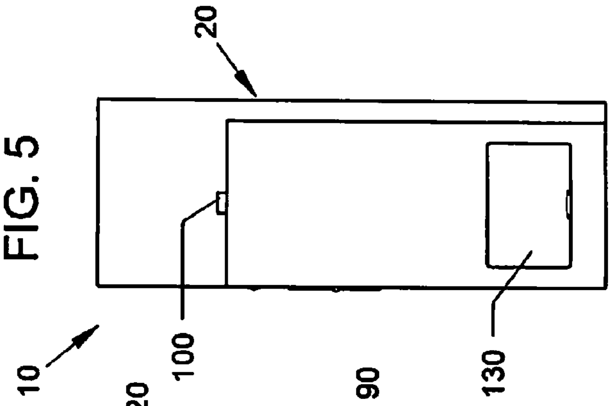
FIG. 5 is a rear view of the dispensing unit and deposit return unit of FIG. 1.
Figure 3:
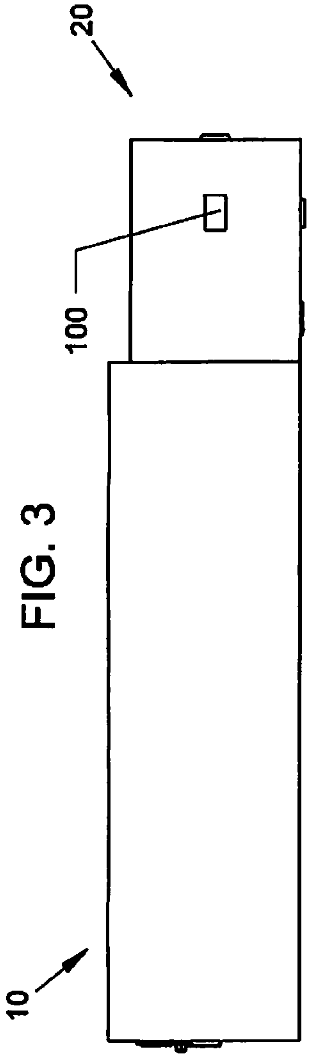
FIG. 3 is a top view of the dispensing unit and deposit return unit of FIG. 1.
Figure 4:
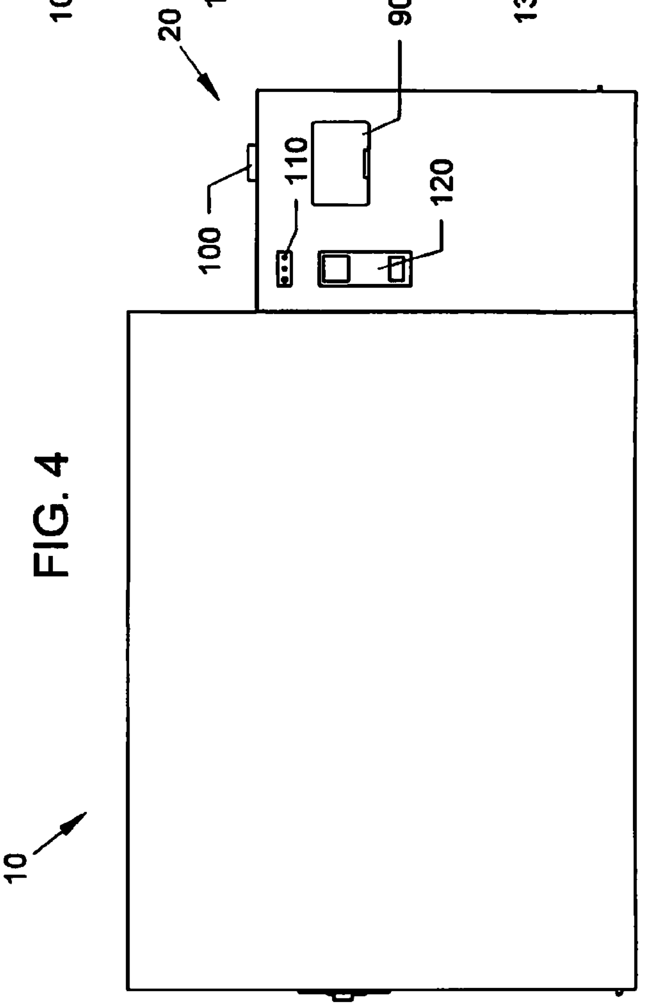
FIG. 4 is a right side view of the dispensing unit and deposit return unit of FIG. 1.
Figure 7:
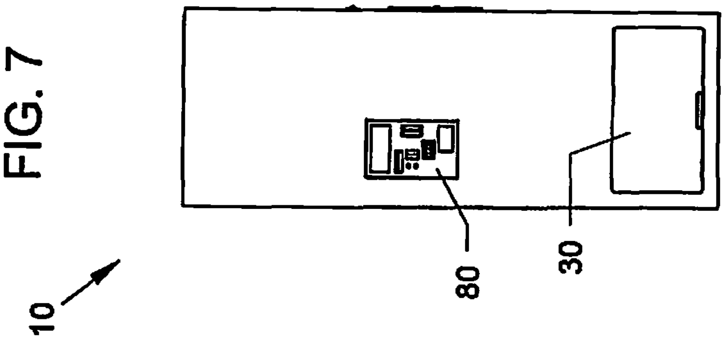
FIG. 7 is a front view of the dispensing unit and deposit return unit of FIG. 1.
Figure 6:
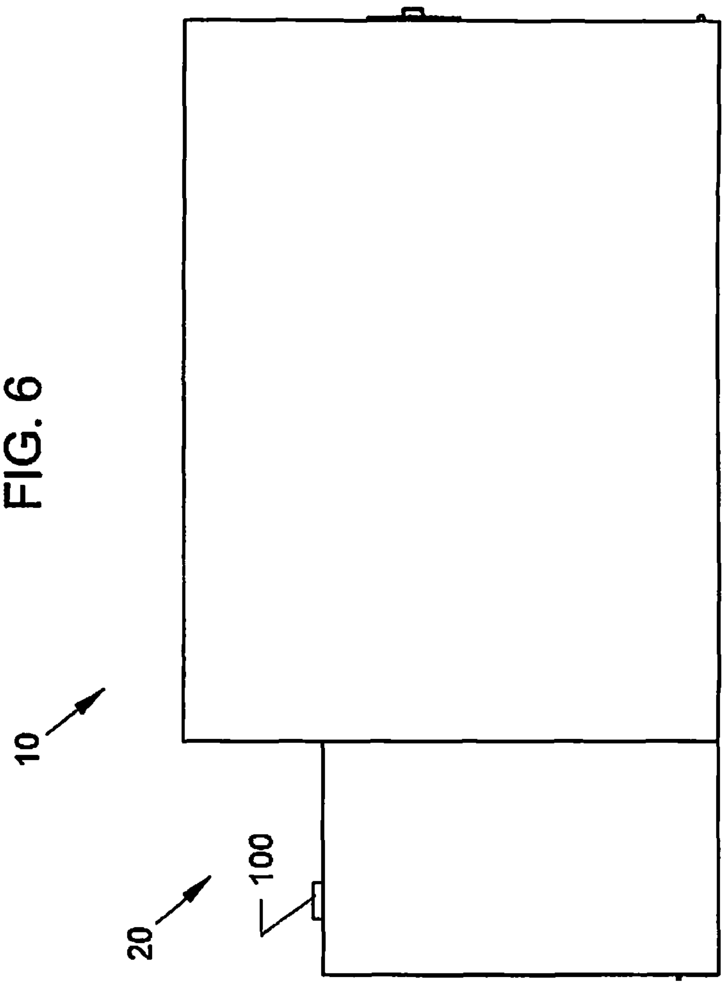
FIG. 6 is a left side view of the dispensing unit and deposit return unit of FIG. 1.

10 Product dispensing unit.
20 Container & deposit return unit.
30 Product dispensing door.
40 Product dispensing chamber (bin)
50 Bundled firewood. (bundled package)
60 Returnable, reusable container.
70 Surveillance tag (activator)
80 Dispenser payment and control console.
90 Container return door.
100 Surveillance tag detector/sensor.
110 Deposit and return control console.
120 Deposit and return money dispenser.
130 Service door for reusable container retrieval.
140 Bundle storage rack.
150 Bundle support rail and push plate track.
155. U shaped channels for bushing 170
160 Bundle push plate.
170 Push plate bushing rides in the support rail.
180 Gear motor drives push plate via drive strap.
190 Drive strap/band wraps around motor shaft and feed around roller at opposite end of storage rack. Clamps to bottom of push plate.
200 Strap clamp on push plate.
210 Strap roller.
220 Strap sensor plate.
230A/230B Strap plate sensors.
240A/240B Bundle drop sensors.
250A/250B Dispense door open/close sensor. A=door. B=frame.
260A/260B Return bag sensors.
265 Return bag chamber.
270 Linear actuator.
274 extendable and retractable arm
275 pivotal attachment for actuator
280 Return bag trap door drops returned bag into storage chamber for later retrieval.
285. pivot connection for arm of actuator
290 Returned bag storage chamber.
300A/300B/300C Container return door open/close sensors. A=top door. B=bottom door. C=frame.
310A/310B Container return electronic door lock/latch. A=door mount catch with hole. B=frame mount lock with pin.
320A/320B Trap door closed sensor.
330A/330B Returned bag drop sensors.
340 Alternate bag type return container.
350 Draw string.
360 Hook and loop (VELCRO®) closures.
370 Alternate box type return container.
380 Pouch holds surveillance tag.
390 Handles.
400 Trap door hinge.
500 Vending steps of dispensing unit
600 Recycling steps of return unit FIG. 1 is a perspective of the novel dispensing unit 10 and deposit return unit 20. FIG. 2 is another perspective view of the dispensing unit 10 and deposit return unit 20 of FIG. 1 with the product dispensing door 30 open. FIG. 3 is a top view of the dispensing unit 10 and deposit return unit 20 of FIG. 1. FIG. 4 is a right side view of the dispensing unit 10 and deposit return unit 20 of FIG. 1. FIG. 5 is a rear view of the dispensing unit 10 and deposit return unit 20 of FIG. 1. FIG. 6 is a left side view of the dispensing unit 10 and deposit return unit 20 of FIG. 1. FIG. 7 is a front view of the dispensing unit 10 and deposit return unit 20 of FIG. 1.

Referring to FIGS. 1-7, the deposit return unit 20 can be a free-standing unit. Alternatively, the deposit return unit 20 can be incorporated into the dispensing unit cabinet.

Dispensing Unit

Figure 9:
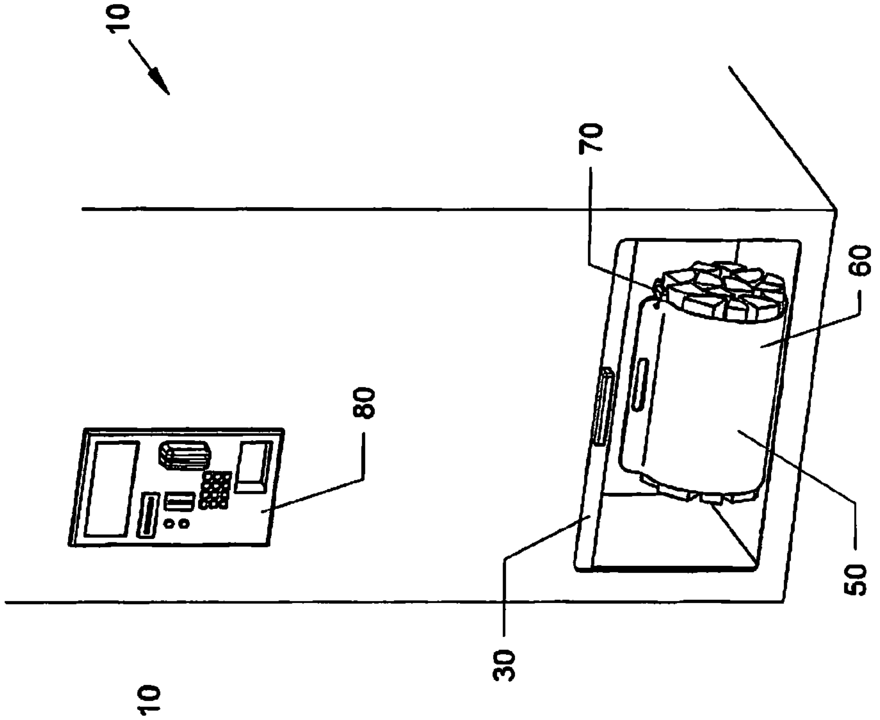
FIG. 9 is another view of the dispensing unit of FIG. 8 with dispensing door open.
Figure 8:
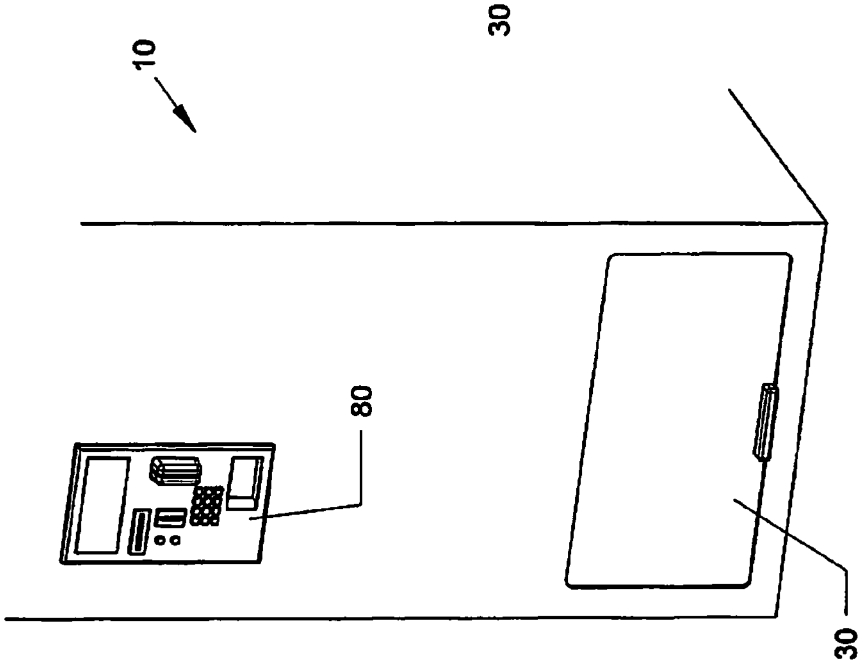
FIG. 8 is an enlarged partial front view of the dispensing unit of FIG. 1 with dispensing door closed.

FIG. 8 is an enlarged partial front view of the dispensing unit 10 of FIG. 1 with dispensing door closed. FIG. 9 is another view of the dispensing unit 10 of FIG. 8 with dispensing door 30 open. The dispensing unit 10 have a vending machine type function to dispense bundled packages 50, such as bundled wood, and the like. Each bundled package can include a returnable and reusable container 60, such as a rigid or flexible bag and/or wrapped sleeve of a durable material, such as but not limited to onion sack, canvas, woven fabric, nylon, combinations thereof, and the like. The recyclable container 60 is designed to be reusable and be refilled multiply times. The container would have an integral or attached activator (security tag) 70. The activator can be installed/attached to the end panel of the container in order to prevent damage to the activator during the vending process. The container can or cannot contain an integral handle. The container can have a unique color and/or have attached a unique label The unique color or label can be recognizable at distance A flexible recyclable container can have hook and loop (VELCRO®) fasteners to close the container.

The activator is recognizable by a sensor. This recognition is unique between the activator and sensor. The activator can either be placed in a pocket that is part of the flexible container or attached to container in a semi permanent attachment. The activator is durable and suitable for multiple cycles of usage, contains no moving parts, is weather resistant and can be transferable to another container of the same type.

The sensor can be able to detect the activator's presence within a defined area. The detection does not require direct contact between the sensor and the activator. The sensor can be capable of generating a signal when the activator is in the presence of the sensor. The signal is such that it can be recognized by a Program Logic Controller (PLC).

The security tag (activator) and sensor 100 can use the technology that is used with anti-theft tags that are attached to new merchandise such as clothing, where a sensor 100 detectors the merchandise with tag leaving a store to set off an alarm. See for example, U.S. Pat. No. 5,475,367 to Prevost; U.S. Pat. No. 6,137,414 to Federman; U.S. Pat. No. 6,255,958 to Haimovich et al. and U.S. Pat. No. 8,289,168 to Liu et al., which are all incorporated by reference.

Referring to FIGS. 1-9, the front of the dispensing unit 10 can include a vending machine type dispenser payment and control console 80 that can include an display, such as but not limited to a LCD (liquid crystal display) screen with instructions for taking money/currency that can include but is not limited to slots for bills, coins, and swipes for credit cards, debit cards, and the like. Console 80 can be similar to those found on gas station pumps, and the like. Such a control console and related components can be found in at least U.S. Published Patent Application 2003/0132289 to Jacobi et al., and U.S. Pat. No. 6,061,668 to Sharrow; U.S. Pat. No. 5,939,694 to Holcomb et al.; U.S. Pat. No. 5,842,188 to Ramsey et al.; U.S. Pat. No. 5,233,167 to Markman et al.; U.S. Pat. No. 4,752,876 to Couch et al., which are all incorporated by reference in their entirety.

A product dispensing door 30 can be opened by the user after payment is made to the console 80. The door 30 can be a rollup door, or slide up door, or a rotating bin door, or a rotating mailbox door, and the like, that is only operable after the correct amount of payment is made.

Figure 10:
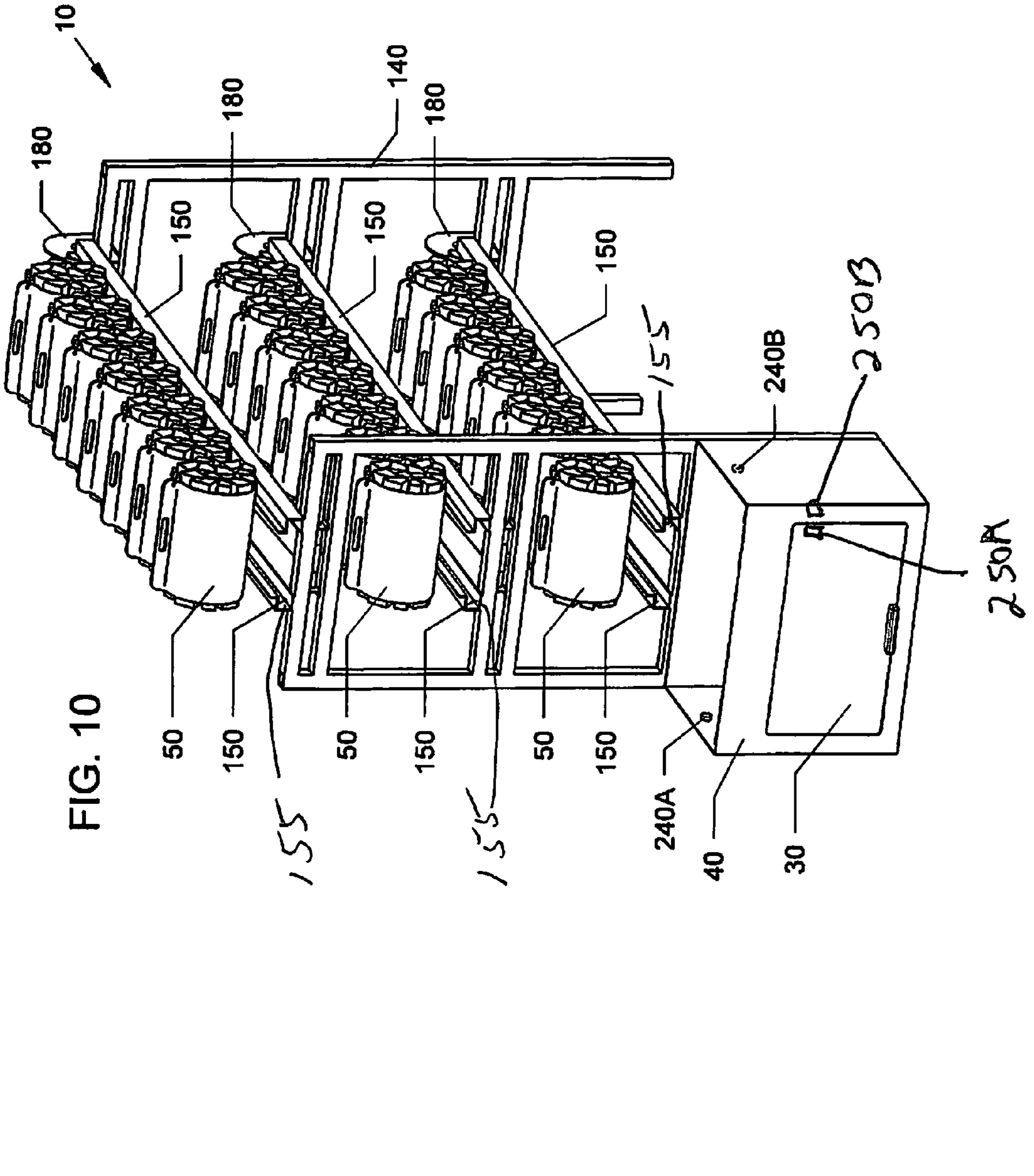
FIG. 10 is a front perspective of the dispensing unit of the preceding figures without cabinet and a full load of products.
Figure 11:
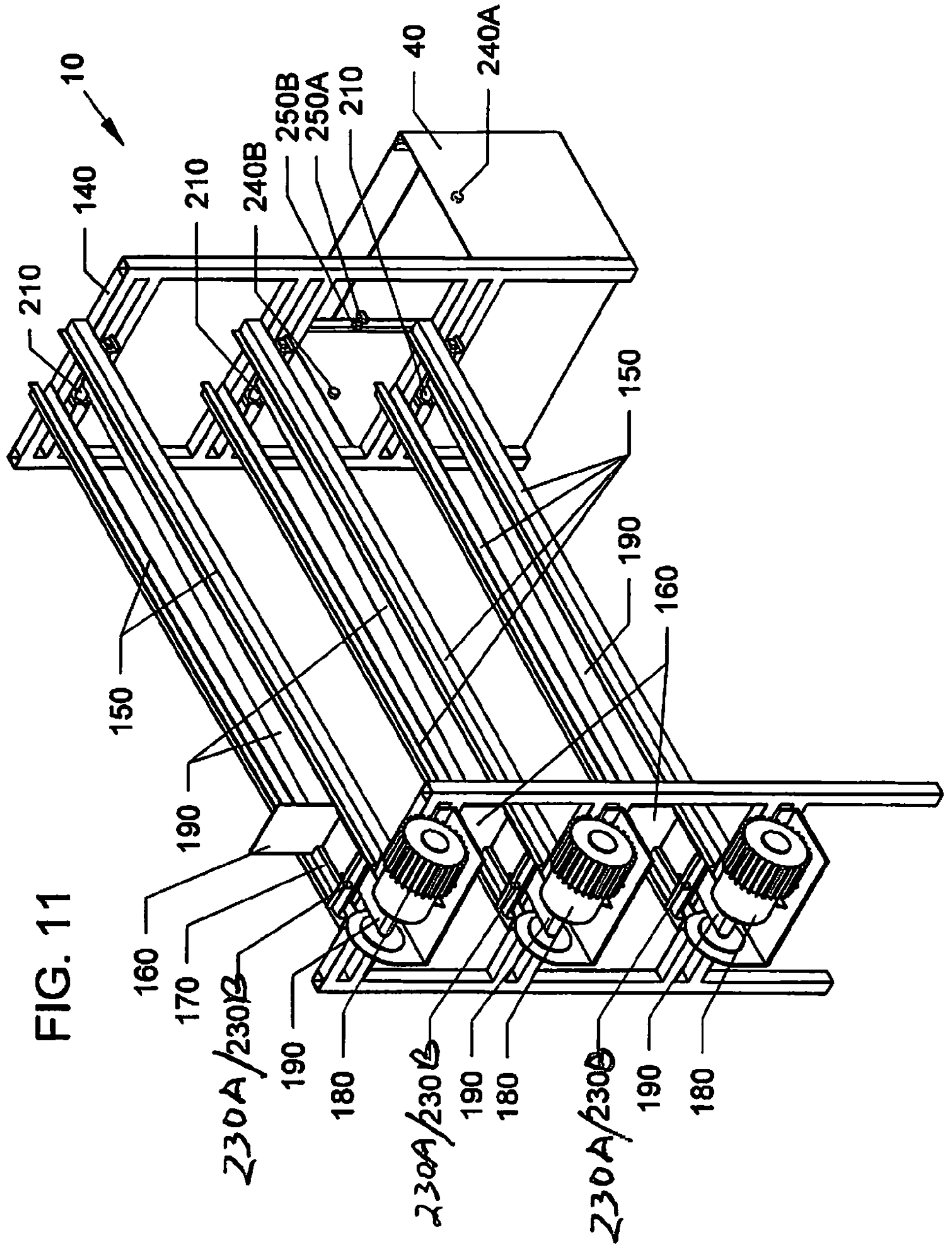
FIG. 11 is a side rear perspective of the dispensing unit of FIG. 10 with no products.
Figure 13:
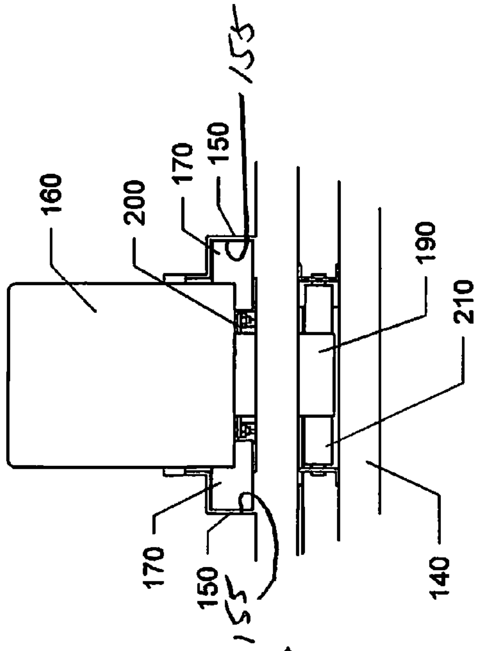
FIG. 13 is a cross-sectional view of the dispensing unit interior of FIG. 12 along arrows 13X showing push plate details.
Figure 12:
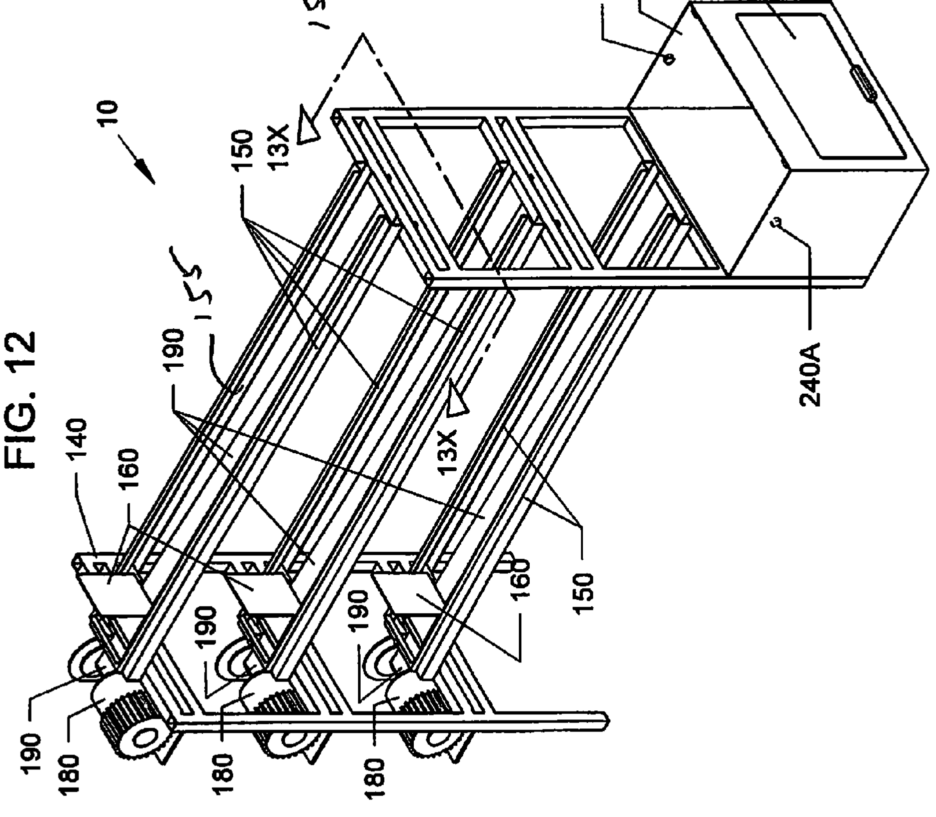
FIG. 12 is a side front perspective view of the dispensing unit of FIG. 10 with no products.
Figure 14:
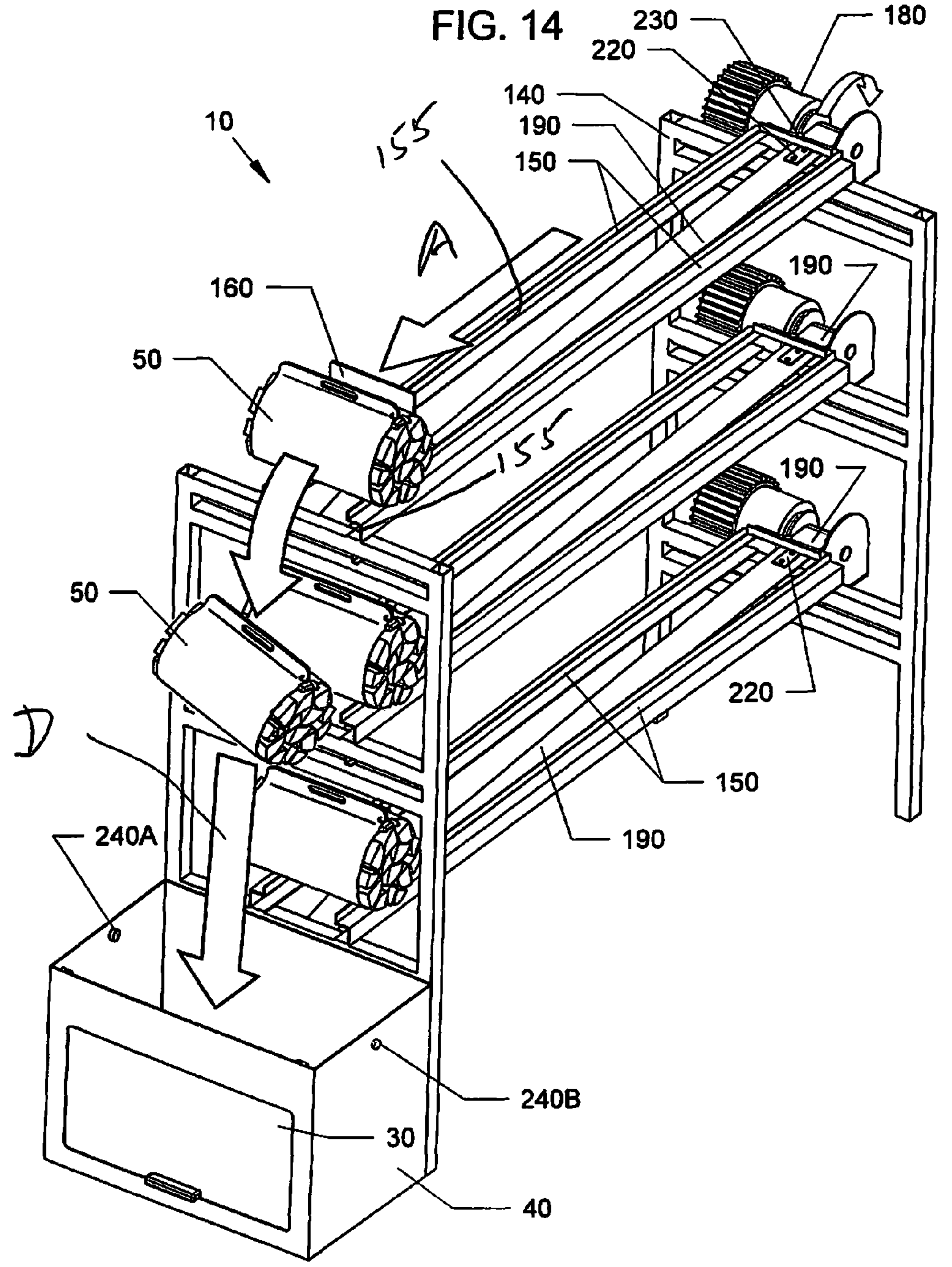
FIG. 14 is a front perspective of the dispensing unit of FIG. 13 showing product delivery to dispensing chamber.
Figure 15:
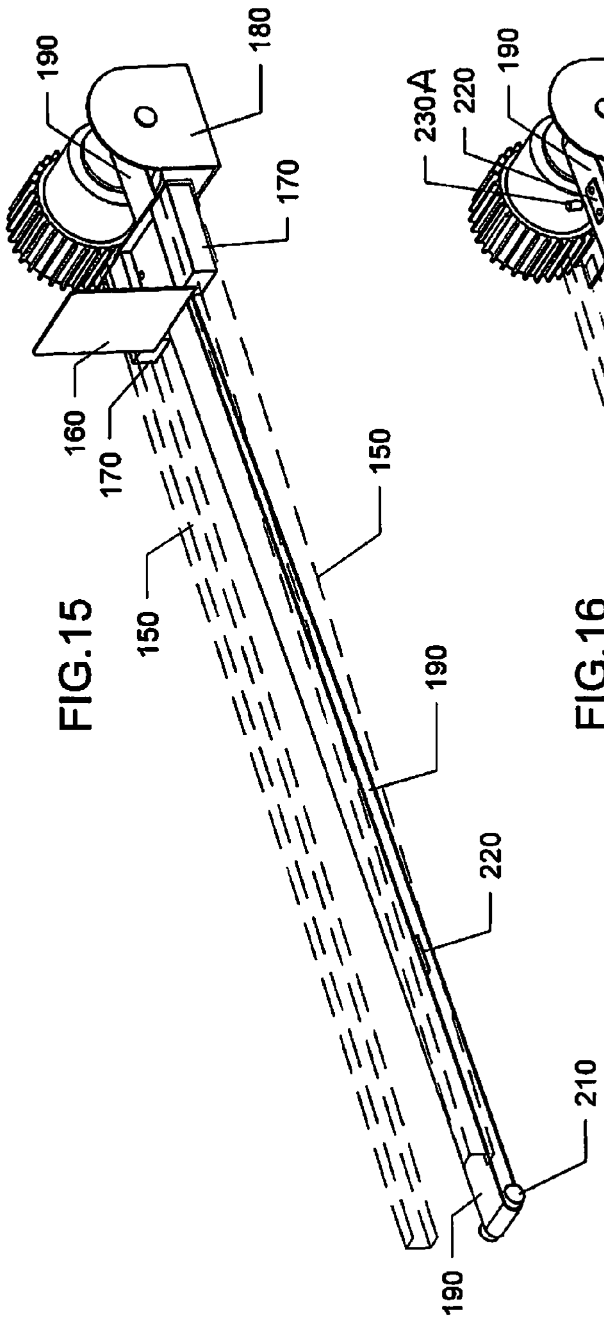
FIG. 15 is a top perspective view of the push plate drive assembly detail of the dispensing unit of FIGS. 10-14 with push plate fully retracted.
Figure 16:
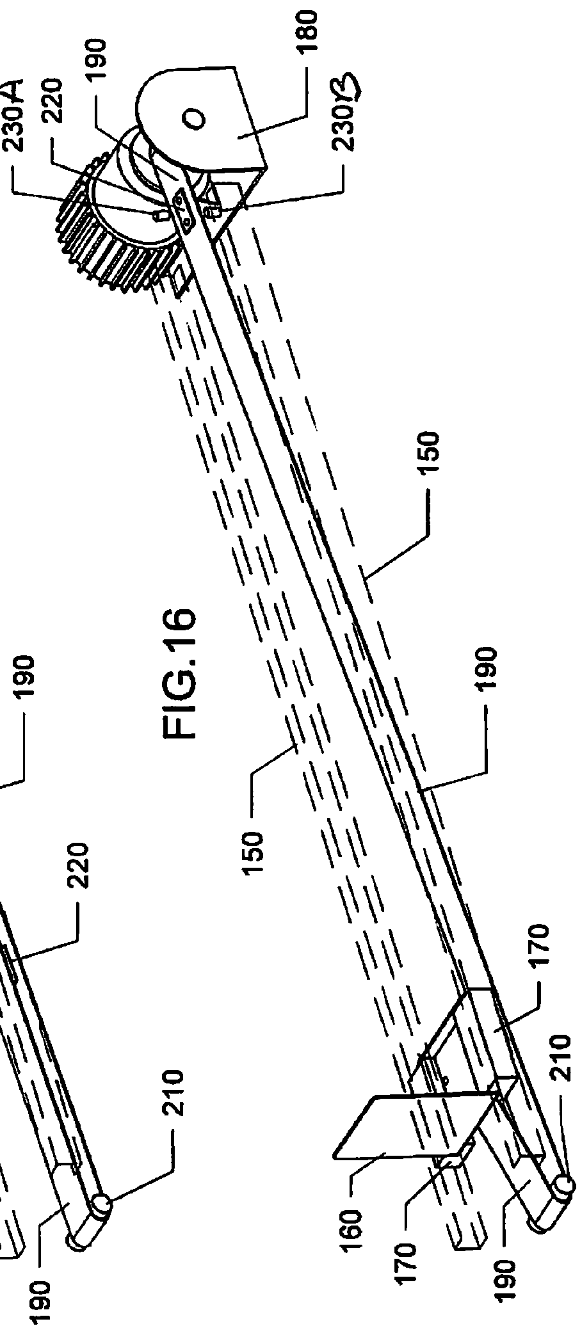
FIG. 16 is another view of the push plate drive assembly of FIG. 15 with push plate fully extended (all product has been vended).
Figures 17, 18A, 18B:
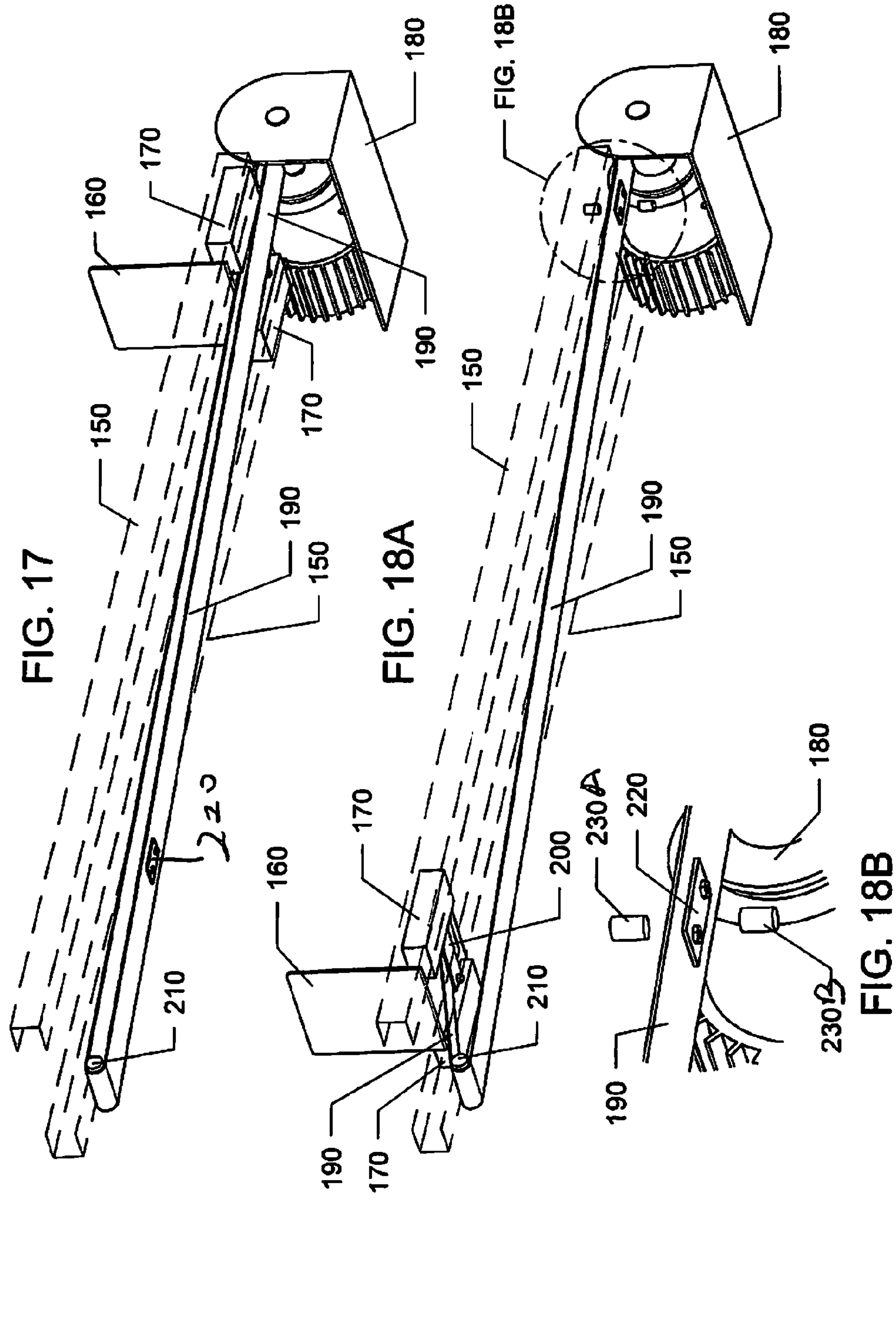
FIG. 17 is a bottom perspective view of the push plate drive assembly of FIG. 15 with push plate fully retracted.
FIG. 18A is a bottom perspective view of the push plate drive assembly of FIG. 16 with push plate fully retracted.
FIG. 18B is an enlarged view of the belt/strap with plate and sensor detail of FIG. 18A.

FIG. 10 is a front perspective of the dispensing unit 10 of the preceding figures without cabinet and with a full load of products 50. FIG. 11 is a side rear perspective of the dispensing unit 10 of FIG. 10 with no products. FIG. 12 is a side front perspective view of the dispensing unit 10 of FIG. 10 with no products. FIG. 13 is a cross-sectional view of the dispensing unit 10 interior of FIG. 12 along arrows 13X showing push plate details. FIG. 14 is a front perspective of the dispensing unit 10 of FIG. 13 showing product delivery to dispensing chamber. FIG. 15 is a top perspective view of the push plate drive assembly detail of the dispensing unit 10 of FIGS. 10-14 with push plate 160 fully retracted. FIG. 16 is another view of the push plate drive assembly of FIG. 15 with push plate 160 fully extended (all product has been vended). FIG. 17 is a bottom perspective view of the push plate drive assembly of FIG. 15 with push plate 160 fully retracted. FIG. 18A is a bottom perspective view of the push plate drive assembly of FIG. 16 with push plate 160 fully retracted. FIG. 18B is an enlarged view of the belt/strap 190 with plate 220 and sensor detail of FIG. 18A.

Referring to FIGS. 1-18B, the inside of the dispensing unit 10 can include one or more stacked bundle support rail and push plate track(s) 150 in parallel to one another mounted on a bundle storage rack 140. On each of the support rail and plush plate track(s) 150 can be product bundles 50, such as bundled firewood. At one end of each of the rail support rail and plush plate track(s) 150, can be an electric gear motor 180 with rotating motor shaft. When activated the motor 180 rotates a drive strap/band 190 which is wrapped round the motor shaft and feeds around roller(s) 210 at an opposite end of the storage rack 140. The strap/band 190 can be a flexible belt, formed from pliable material, such as but not limited to cloth, rubber, combinations thereof, and the like. An L-shaped push plate 160 has a bottom leg attached by a strap clamp 200 to a fixed position on the strap/band 190. On opposite side of the bottom leg of the push plate 10 can be bushings 170, which are sized to mateably slide within mateable U shaped channels 155 in the support rail and plush plate track(s) 150. Additionally, a strap sensor plate 220, such as a metal plate, is fixed by fasteners, such as but not limited to screws, and the like to another fixed location along the strap/band 190, the purpose of which will be described below.

When money is inserted into the dispenser payment and control console 80, the top motor 180 on the top support rail and plush plate track(s) 150, is activated causing the strap/band 190 with push plate 160 to move in the direction of arrow A (FIG. 14), and causes a bundle package 50, such as bundled firewood to drop along arrow D into a product dispensing chamber (bin) 40. Sensors 240A, 240B such as but not limited to an arrangement of an optical transmitter and receiver can detect when the falling bundle package 50 crosses a signal therebetween. When the signal is blocked by falling bundle 50, the motor 180 can deactivate resulting in only one bundle 50 being in chamber 40. The user can raise door 30 to then retrieve the bundle 50.

Metal plate detecting sensors 230A, 230B can be mounted inside of the dispensing unit adjacent to the motor 180 end of the strap/band 190. These sensors 230A, 230B can be proximity sensors which detect when each strap/band fixed metal plate 220 passes by the proximity sensors. The proximity sensors 230A, 230B can include a sensor which can detect the presence of metal, and when metal is detected a circuit can be opened or closed. Such types of proximity sensors, 230A, 230B that can be used, can include but are not limited to those referenced in U.S. Pat. No. 5,012,206 to Tigges, which is incorporated by reference. While two sensors 230A, 230B are shown, the invention could work with one metal proximity sensor.

As shown in FIGS. 18A, 18B, the plate 220 is detected when the push plate 160 has reached the opposite end of the support rail and plush plate track(s) 150. Once detected, the next support rail and plush plate track(s) 150 underneath the top one becomes activated when money is inserted into dispenser payment and control console 80. With each purchase, the push plate 160 will move in the direction of arrow A, one time after another until all the bundle(s) 50 have been depleted from the respective support rail and plush plate track(s) 150. When all the support rail and plush plate track(s) 150 have been emptied, the product dispensing unit can be replenished as needed with new package bundle(s) 50. Alternatively, the bottom track 150 can be depleted first followed by the next above track 150, and so forth, until all products are removed. When the last track 150 has been depleted, the entire dispensing unit 10 can be automatically shut down.

Referring to FIGS. 10-11, door 30 can have sensor 250A mounted thereon, and sensor 250B can be mounted on the door frame adjacent to the door 30. Sensors 250A, 250B can be one or two proximity sensors (such as sensors 230A, 230B previously described) or one proximity sensor and one metal plate. For example, a metal plate can be mounted on the edge of the door 30 and a proximity sensor can be mounted on the door frame next to the metal plate, or vice versa. When sensors 250A, 250B are aligned together, the dispensing unit 10 is operational. When door 30 is opened and sensors 250A, 250B becomes misaligned, dispensing unit 10 is shut off from collecting money and from running. Closing door 30 allows the dispenser unit 10 to operate.

Deposit Return Unit

Figure 20:
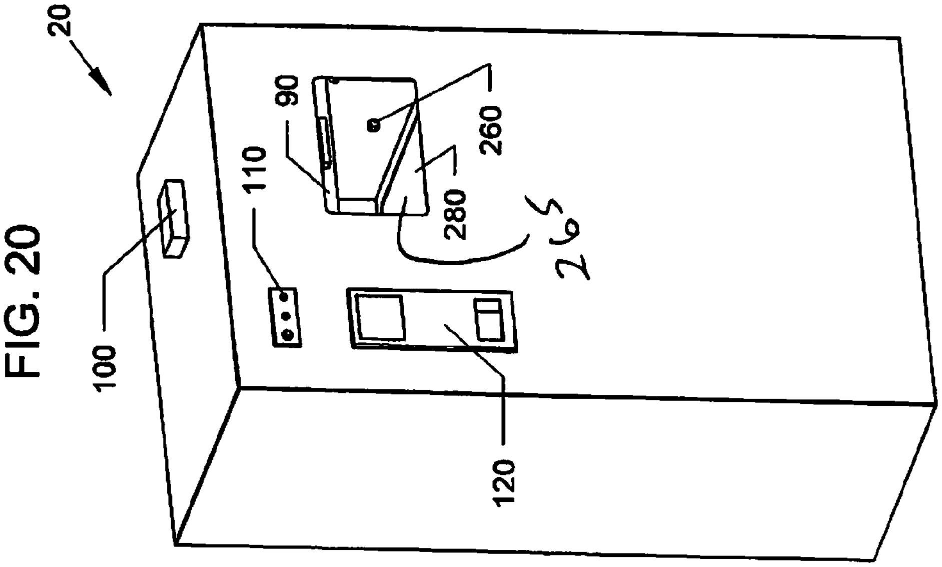
FIG. 20 is another view of the deposit return unit of FIG. 19 with return door open.
Figure 19:
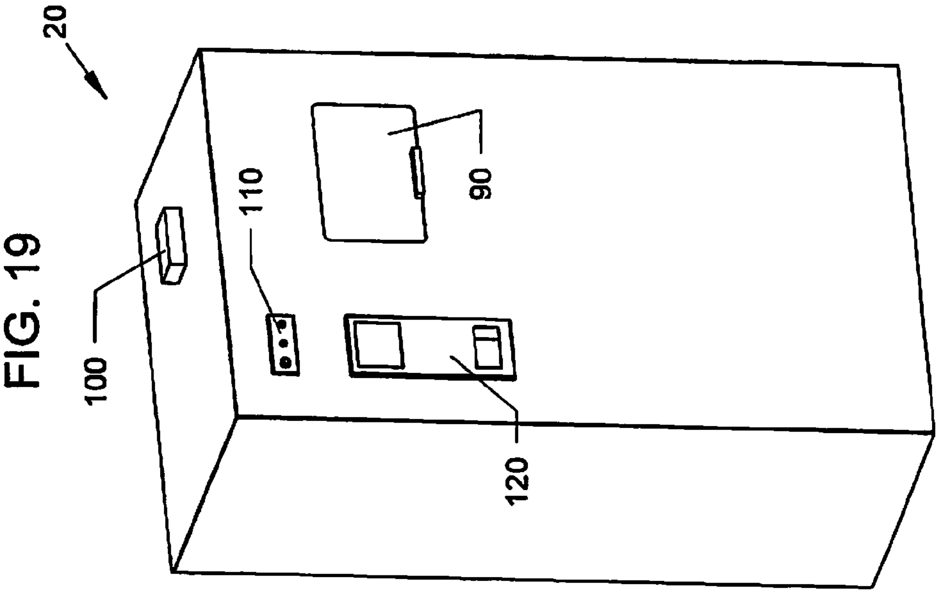
FIG. 19 is a front perspective view of the deposit return unit of FIGS. 1-7 with return door closed.
Figure 23:
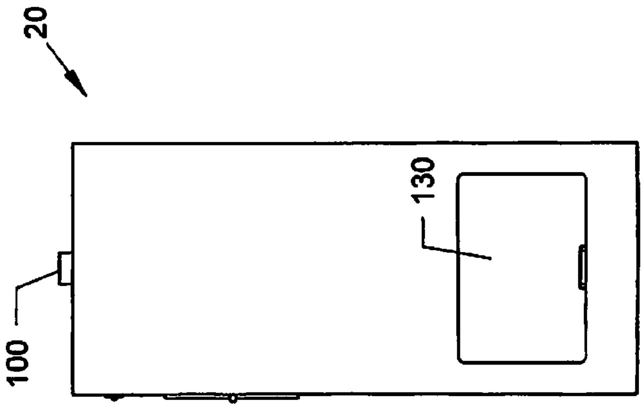
FIG. 23 is a right side view of the deposit return unit of FIG. 19.
Figure 21:
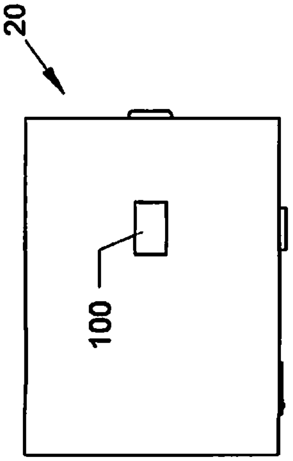
FIG. 21 is a top view of the deposit return unit of FIG. 19.
Figure 22:
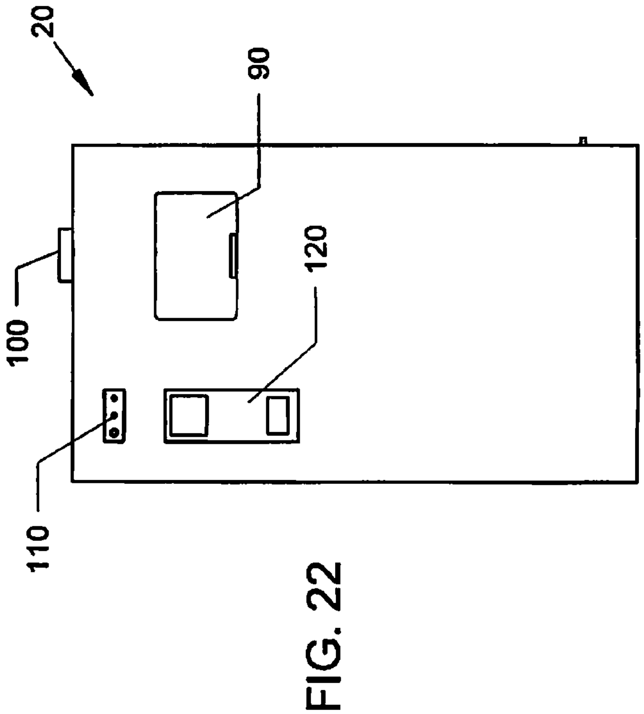
FIG. 22 is a front view of the deposit return unit of FIG. 19.
Figure 25:
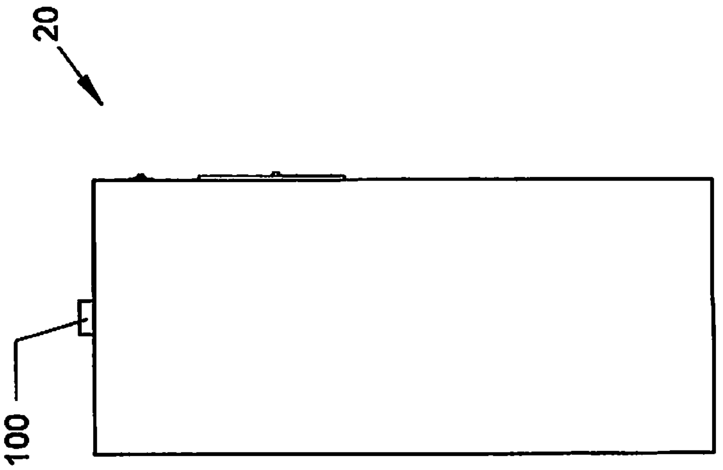
FIG. 25 is a left side view of the deposit return unit of FIG. 19.
Figure 24:
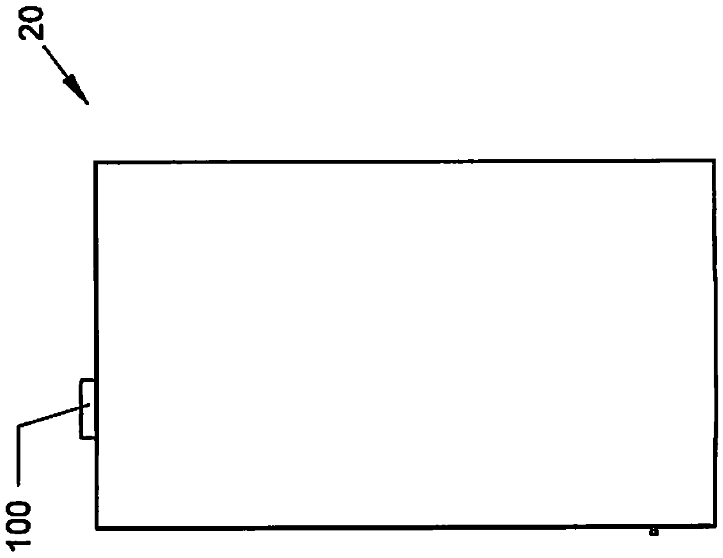
FIG. 24 is a rear view of the deposit return unit of FIG. 19.

FIG. 19 is a front perspective view of the deposit return unit 20 of FIGS. 1-7 with return door closed 90. FIG. 20 is another view of the deposit return unit 20 of FIG. 19 with return door 90 open. FIG. 21 is a top view of the deposit return unit 20 of FIG. 19. FIG. 22 is a front view of the deposit return unit 20 of FIG. 19. FIG. 23 is a right side view of the deposit return unit 20 of FIG. 19. FIG. 24 is a rear view of the deposit return unit 20 of FIG. 19. FIG. 25 is a left side view of the deposit return unit 20 of FIG. 19.

Referring to FIGS. 1-7 and 19-25, the deposit return unit 20 can be a stand-alone, or attached to the product dispensing unit 10. The deposit return unit 20 can include a container return door 90 which can slide up exposing a return bag chamber 265 above a return bag trap door 280. On the exterior can be a deposit and return control console 110, that can display information on the deposit being refunded, which is above a deposit and return money dispenser 120. Console 110 can include a display such as a LCD (liquid crystal display) and light emitting alarm and/or audio indicating alarm, with optional switch, such as a button which can be used by the consumer to start the return cycle after a container with surveillance tag is placed inside chamber 265 and the door becomes locked. A surveillance tag detector/sensor 100 on top of the unit 20 can be used to detect the returning reusable container 60, which has the built in surveillance tag 70. A service door 130 on another side of the unit 20 can be used by service providers for the unit, so that the retrieved reusable container(s) 60 can later be removed from the unit 20 as shown later in reference to FIG. 32.

As previously described, The security tag (activator) 70 on the reusable and recyclable container 60 of the bundled package 50 and sensor 100 on the deposit and return unit 20 can use the technology that is used with anti-theft tags that are attached to new merchandise such as clothing, where a sensor 100 detectors the merchandise with tag leaving a store to set off an alarm. See for example, U.S. Pat. No. 5,475,367 to Prevost; U.S. Pat. No. 6,137,414 to Federman; U.S. Pat. No. 6,255,958 to Haimovich et al. and U.S. Pat. No. 8,289,168 to Liu et al., which are all incorporated by reference.

Figure 31:
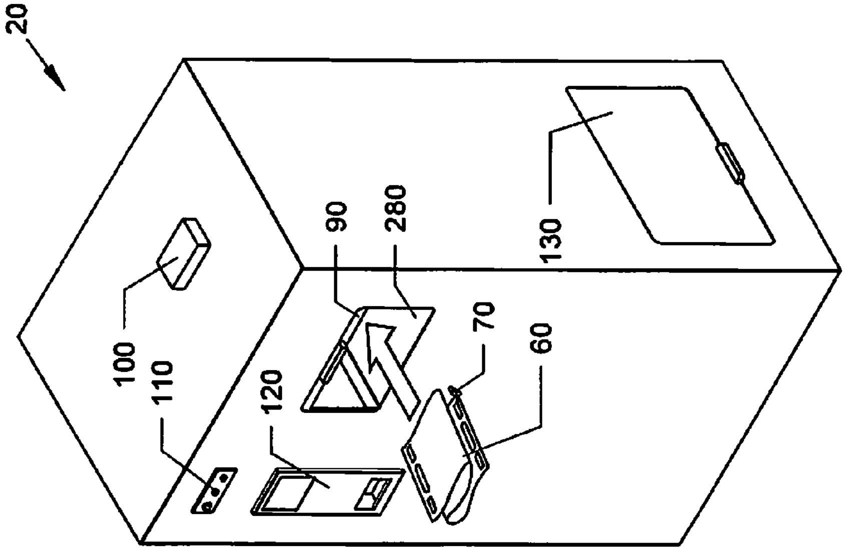
FIG. 31 is a top perspective of the deposit return unit of FIGS. 19-30 with container return door open and reusable bag being inserted.

The consumer returns the recyclable and reusable container 70 with surveillance tag (activator) 70, opens return door 90 and places the container 60 inside of return chamber 265 as shown in FIG. 31. Once the return door 90 is closed, the security tag (activator) 70 is detected by detector 100, the deposit fee can be refunded through the deposit and return money dispenser 120 back to the consumer.

Figure 26:
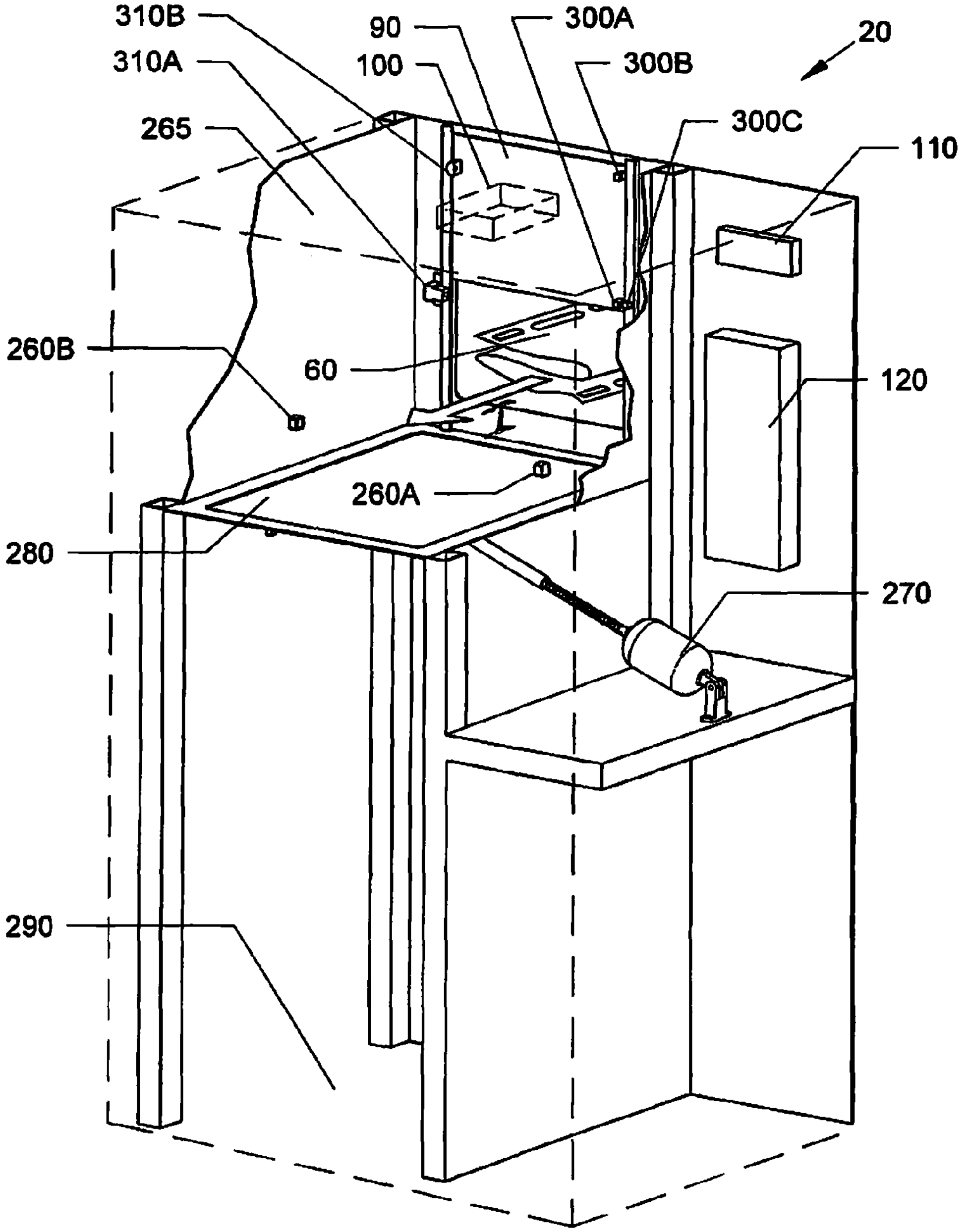
FIG. 26 is a top rear perspective view of the deposit unit return unit of FIG. 19 without cabinet and with a partial return bag chamber cutaway.

FIG. 26 is a top rear perspective view of the deposit unit return unit 20 of FIG. 19 without cabinet and with a partial return bag chamber 265 cutaway. The container return door 90 is open and a reusable container 60 with security tag (activator 70) is being inserted inside along the direction of arrow I.

Figure 27:
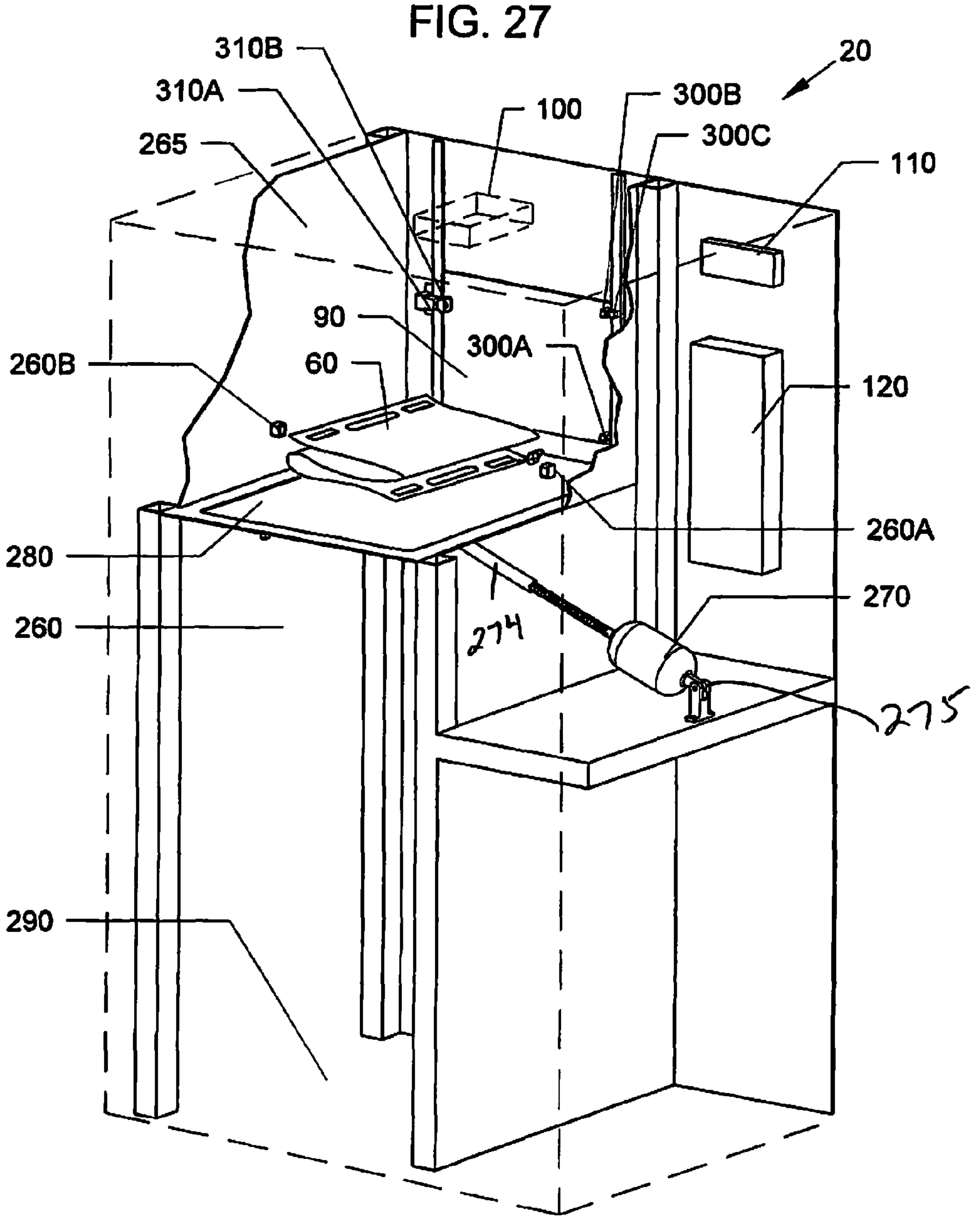
FIG. 27 is another view inside the deposit return unit of FIG. 26 with the reusable container in the return container chamber and the return door closed.

FIG. 27 is another view inside the deposit return unit 20 of FIG. 26 with the reusable container 60 in the return container chamber 265 and the return door 90 closed. The container 60 is breaking the path between the return bag sensors 260A, 260B letting the unit 20 know there is a returned container 60 in the chamber 265. Sensors 260A, 260B can be similar to the optical transmitter(s) and receiver(s) previously described. Here, the signal (or beam) between sensors 260A, 260B is continuous and becomes broken by the placing of the return container 60 in its' path.

When both the surveillance tag sensor 100 detects the security tag 70 on the returned container 60, and the sensors 260A, 260B detect in their path a product that is the size and shape of the container 60 on the trap door 280, is when the extendable arm 274 on the shelf mounted linear actuator 270 starts to retract. The door pivot connector 285 underneath the trap door 280 and pivot connector mount 275 of the linear actuator allow for the trap door 280 to rotate along hinge 400. Alternatively, the consumer puts the returned container 60 into chamber 265 and closes door 90. Then the consumer can activate a switch (such as push a button) to start the authorization cycle, which detects whether the surveillance tag 70 which allows the trap door 280 to drop and allow container 60 to fall into storage chamber 290. If a surveillance tag 70 is not detected and the size and shape of a returned container 60 is not sensed, than an alarm such as but not limited to a light or audio sound can be generated by console 110. This alarm would notify the consumer that deposit money cannot be returned. Alternatively, or additionally, a display can indicate that a deposit cannot be returned. The door 90 can opened and the non returnable package can then be retrieved.

Figure 28:
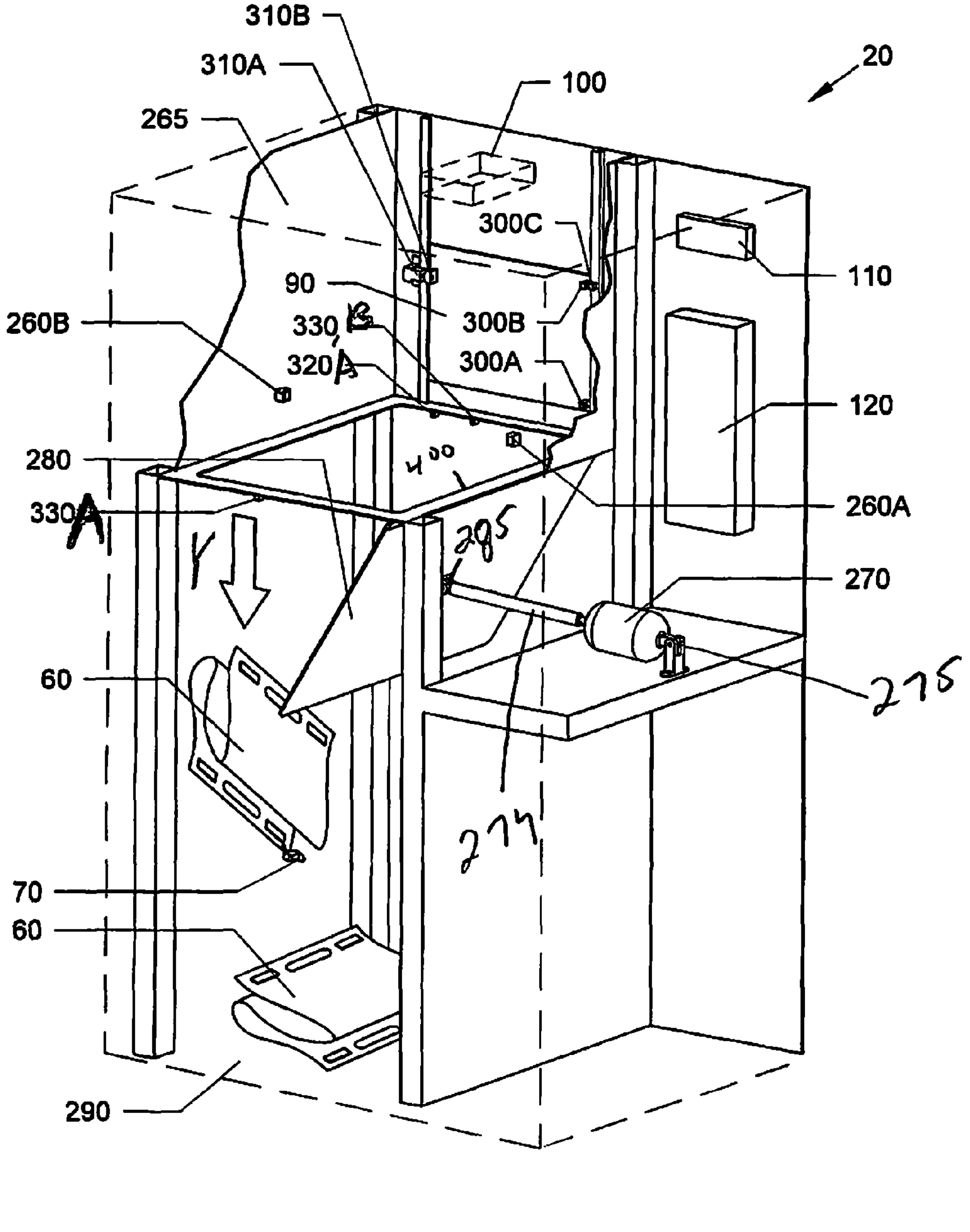
FIG. 28 is another view inside the deposit return unit of FIG. 26 showing the return container trap door dropped and the container falling into the storage area.

FIG. 28 is another view inside the deposit return unit 20 of FIG. 26 showing the return container trap door 280 dropped and the container 60 falling into the return container storage chamber 290 in the direction of arrow Y. Here, the returned container 60 falls through the path of the bag drop sensors 330A, 330B attached to the chute located beneath the trap door 280, as it drops letting the unit 20 know that a returned container 60 has been deposited. When drop sensors 330 A/B detects a dropped container 60 between a beam type signal, this reverses the linear actuator 270 to close trap door 280, authorizing the return of the deposited money amount to the deposit money from dispenser 120. The drop sensors 330A, 330B can be an optical transmitter and sensor similar to those previously described.

Figure 29:
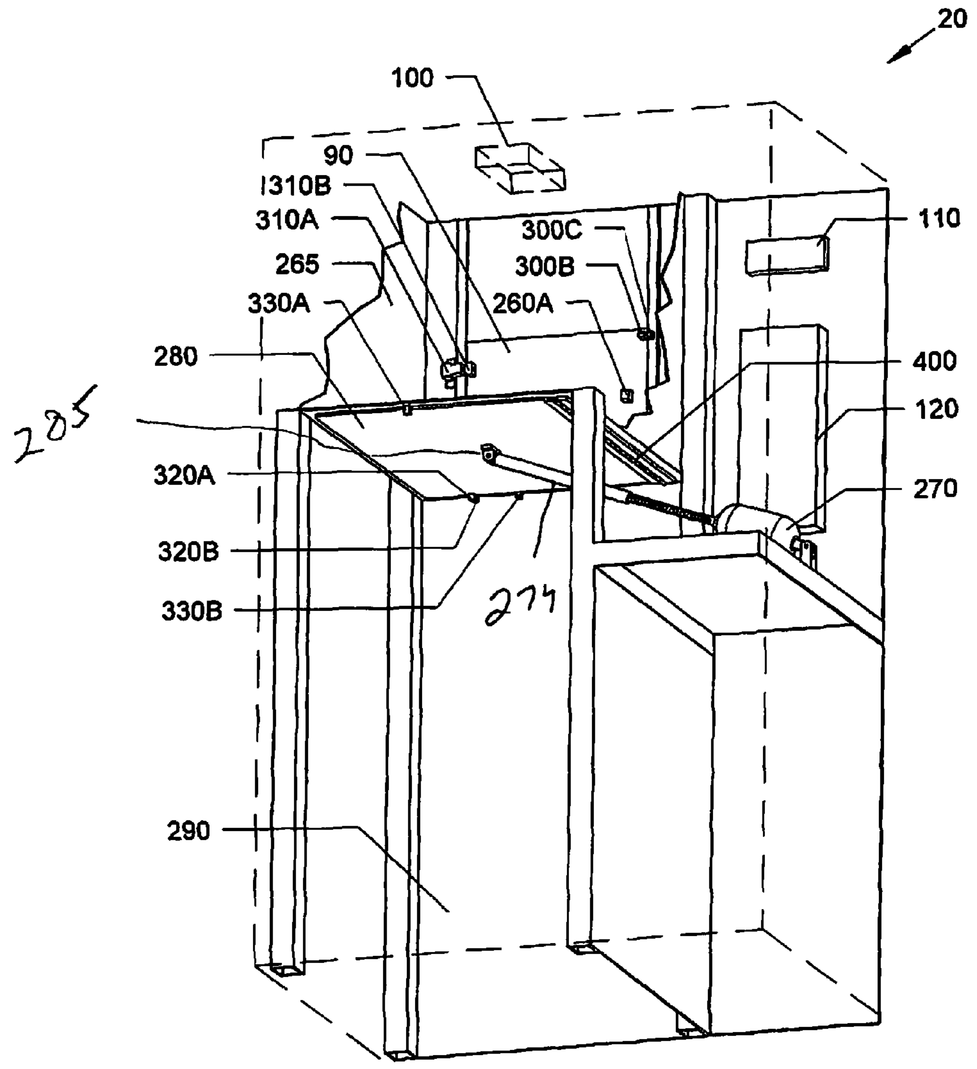
FIG. 29 is a bottom perspective view inside the deposit return unit of FIG. 26 showing the trap door, sensors, and linear actuator with trap door closed.

FIG. 29 is a bottom perspective view inside the deposit return unit 20 of FIG. 26 showing the trap door 280, sensors 320A, 320B, 330A, 330B, and linear actuator 270 with trap door 280 closed.

Figure 30:
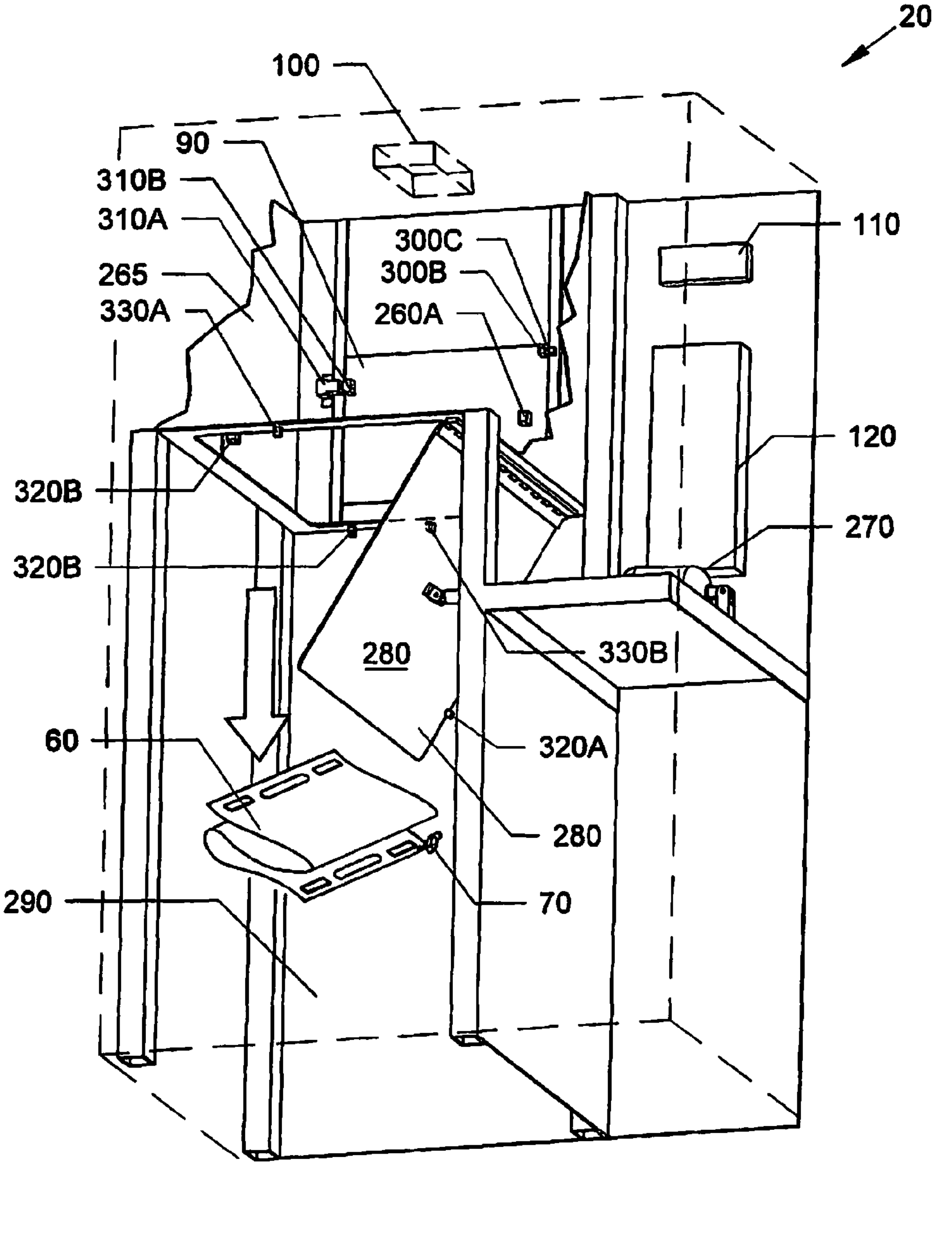
FIG. 30 is a bottom view inside the deposit return unit of FIG. 29 with trap door open.

FIG. 30 is a bottom view inside the deposit return unit 20 of FIG. 29 with trap door 280 open.

Referring to FIGS. 26-30, container return door open/close sensors, 300A, 300B and 300C can include sensor 300A mounted on the bottom of door 90, sensor 300B on the top of the door 90 and sensor 300C on the frame about the door 90, The sensors 300A, 300B, 300C can confirm when door 90 is closed in order for the activation switch (push button) on console 110 to be activated to begin the container return cycle. The door 90 becomes locked to prevent removal of the container 60 during the return cycle. Sensors 300A, 300B, 300C can include but are not limited to proximity sensors (such as those previously described), limit switches, photocell detecting switches, and the like. When door 90 is closed at least sensors 300B, 300C are aligned and door becomes locked and cannot be opened by the consumer. Whenever sensors 300A, 300B, 300C are not aligned, door 90 can be opened by the consumer. Sensor 300A is an optional extra sensor for additional alignment.

Door 90 can be locked by lock mechanism 310A, 310B, which is only engaged when sensor 300B, 300C are aligned. Lock mechanism 310A, 310B can include a door mount catch with hole 310A, and frame mount lock with pin, 310B. The lock mechanism 310A, 310B can be an electronic door lock, such as those used on security doors, apartment front doors, bank entry doors, jewelry front doors, pawn shop front doors, and the like, such as but not limited to U.S. Pat. No. 4,013,930 to Geller and U.S. Pat. No. 6,454,324 to Lewis et al., which are incorporated by reference. The door lock mechanism 310A, 310B has an electronic release, which automatically locks the door 90 when closed, and is released electronically when the return cycle has been completed and the deposit money has been refunded.

After sensors 330A, 330B detects dropping container 60, linear actuator 270 reverses to close the trap door 280. Sensors 320A, 320B sense when the trap door 280 is closed, which stops the linear actuator 270 from closing trap door 280 any further. The sensors 320A, 320B can be proximity sensors (such as those previously described), photocells, limit switches, or optical transmitters and receivers, such as those previously described.

The invention sensors, and controls and components can be controlled by a PLC (programmable logic controller), such as but not limited to a "Click" controller, manufactured by Automation Direct, of Atlanta, Ga.

FIG. 31 is a top perspective of the deposit return unit 20 of FIGS. 19-30 with container return door 90 open and reusable containers 60 being inserted therein.

Figure 32:
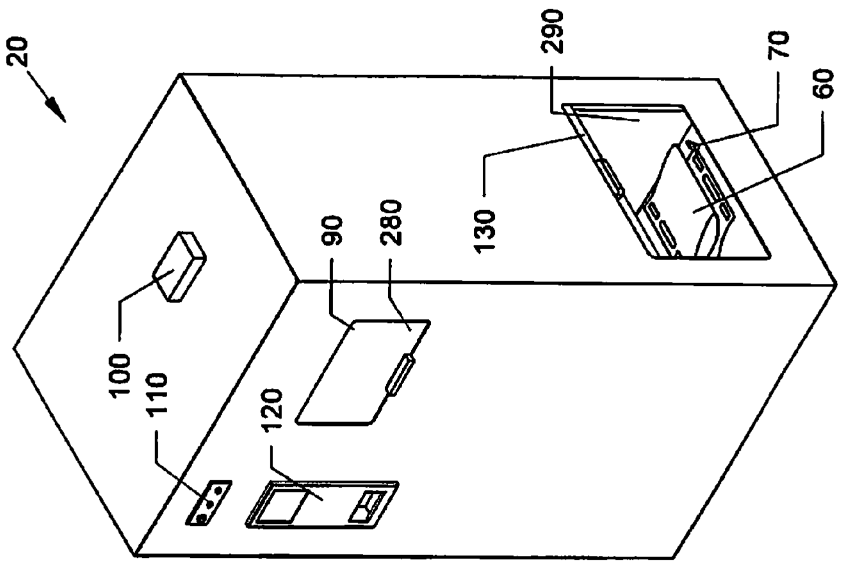
FIG. 32 is another view of the deposit return unit of FIG. 31 with container return door closed, and storage area service door is open exposing returned container.

FIG. 32 is another view of the deposit return unit 20 of FIG. 31 with container return door 90 closed, and storage area service door 130 is open exposing returned container(s) 60 with security tag(s) in returned bag storage chamber 290.

Figure 33:
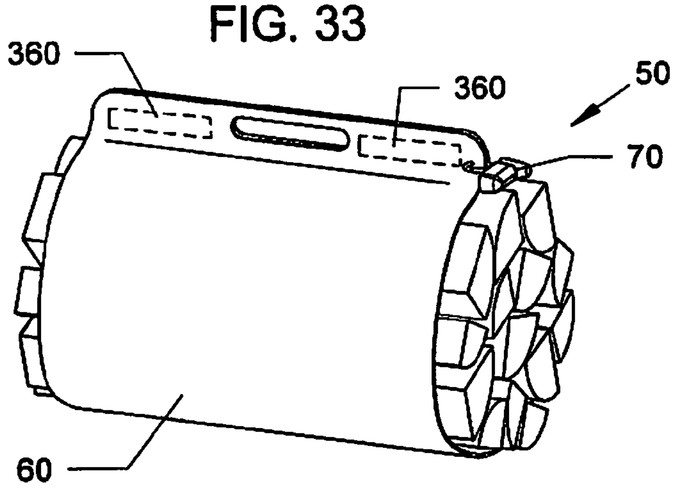
FIG. 33 is a perspective view of the firewood bundled in a reusable container with a surveillance tag attached that can be used with the dispensing unit and deposit return unit of the preceding figures.

FIG. 33 is a perspective view of the firewood package 50 bundled in a reusable container 60 with a surveillance tag 70 attached that can be used with the dispensing unit 10 and deposit return unit 20 of the preceding figures.

Figure 34:
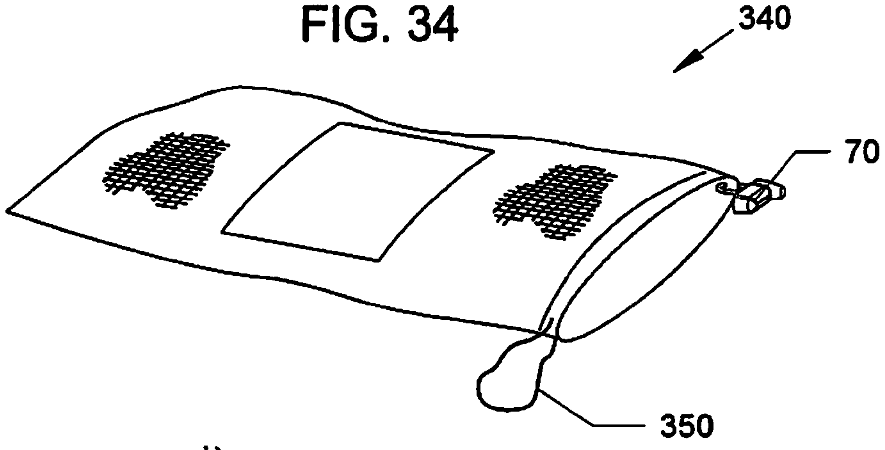
FIG. 34 is a perspective view of an alternate bag style reusable container with a surveillance tag attached that can be used with the dispensing unit and deposit return unit of the preceding figures.

FIG. 34 is a perspective view of an alternate bag style reusable container bag 340 with a surveillance tag 70 attached that can be used with the dispensing unit 10 and deposit return unit 20 of the preceding figures. A drawstring 350 can be used to close the opening to the container bag 340.

Figure 35:
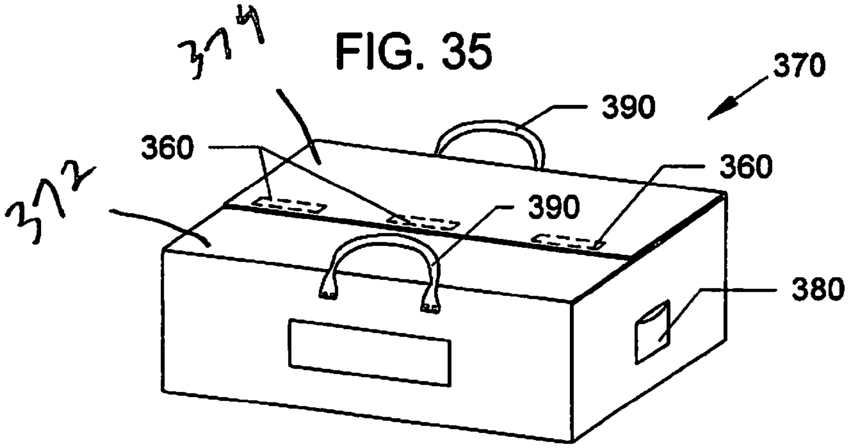
FIG. 35 is a perspective view of another alternate box style reusable container with a surveillance tag attached that can be used with the dispensing unit and deposit return unit of the preceding figures.

FIG. 35 is a perspective view of another alternate box style reusable container 370 with a surveillance tag 380 placed in a pouch on the box container 370 that can be used with the dispensing unit 10 and deposit return unit 20 of the preceding figures. Handles 390 can be used to lift the container 370. Upper flaps 372, 374 on the container can be closed with fasteners, such as but not limited to hook and loop fasteners (VELCRO®), and the like.

FIG. 36 is a flowchart of the vending steps of the dispensing unit. FIG. 37 is a flowchart of the recycling steps of the return unit.

The vending type system can include a system for vending firewood or other bulky items in non rigid containers or liquids or gases in rigid containers. The system allows for the collection of a deposit on the container and the automated refund of the deposit.

In the preferred embodiment, individual bundles of wood are placed inside of recyclable containers. The recyclable containers are placed on conveyor belt racks inside of a vending dispenser.

The customer can purchase a bundle of firewood (or other items such as bottled water, propane). As part of purchase a deposit it collected on the container. After the product is used the empty container can be returned and the deposit refunded back to the customer. The system can verify that the correct recyclable container is being returned by detecting the activator tag on the container with a sensor and confirming the container with security sensors, and then the vending machine automatically refunds the deposit at a deposit return dispenser.

The novel system components can include a vending machine, recyclable container, activator, sensor, PLC, receptacle, push button and coin changer.

The vending dispenser is capable of dispensing large items and has a storage and transfer system that is adaptable to different types of containers For payments of the goods and the deposit, the vending machine can collect coins, paper money as well as be capable of accepting credit cards and debit cards. The vending dispenser can vend multiple items at multiple prices. The vending dispenser can vend products that require a deposit on the container and also those that do not require any deposits.

The vending dispenser can refund money that has been previously collected as a deposit The refund can be made at any time that a recyclable container is returned to the vending return unit and is not a function of a purchase that is made at the same time. The vending return unit can have a return drawer or door for the acceptance of returnable containers on which a deposit has been collected and the ability to automatically refund the deposit back to the customer.

The PLC (programmable logic controller) can receive signals from the sensor(s) on the returning containers, and c, controls door operations (to open and accept the returned container), and instructs a coin changer to dispense funds.

The instruction to dispense funds (returning the deposit) is contingent on the sensor verifying that the activator was in presence of the sensor. That the article containing the activator was moved to a new location and that the article was generally the size and shape of the article that contained the activator.

The receptacle return chute can be an enclosure with several attributes. The interior size should be sufficient to accept the article that contains the activator. The receptacle can have two doors, one of which is exposed to the exterior of the enclosure.

The second door provides access to the interior of the unit from the receptacle. Both doors have locking mechanisms that are controlled by the PLC. The sensor can be mounted on the inside of the receptacle in such a manner that activation will occur if an activator is placed in any location within the receptacle.

The receptacle and the doors attached to it can be shielded to prevent false activation from false activation signals. This shield protection can prevent an activator that is outside of the receptacle from triggering the sensor.

A control outside the unit, such as a push button can be attached to the outside of the vending machine and when pushed instructs the PLC to begin the process of verification of the activator.

The coin changer (coin box) can contain a bank of funds and returns the amount of the deposit when instructed to do so by the PLC. The funds can be returned to the coin box or to a deposit return adjacent to the container return.

Although the sensors described above reference optical transmitters and receivers, the sensors, can include other types of technology such as but not limited to ultrasonic transducers, sound detectors, and the like, and combinations, thereof.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A vending system for reusable containers, comprising:

a housing for storing items in a plurality of reusable containers, the reusable containers comprising;

a plurality of separate transferable weather resistant security tags, each of the separate transferable weather resistant security tags being attached to each of the reusable containers;

a payment window adjacent to the housing for accepting payment for each of the reusable containers with the product and for accepting deposits for each of the reusable containers;

a plurality of vertically stacked racks inside the housing wherein each rack supports a track and a belt for storing the reusable containers thereon, the tracks and belts being above one another, wherein the system dispenses each of the stored reusable containers after each payment, and wherein one track and belt with the stored reusable containers is emptied and depleted before another track and belt with the stored reusable containers is started to be emptied and depleted;

a return window on the housing for returning the reusable containers to the housing without the items;

a verifier for verifying that the returned reusable containers have originated from the housing, the verifier includes a sensor adjacent to the deposit return receptacle, wherein activating the sensor with the security tag on each reusable container is adapted for allowing the deposit return to the customer; and a deposit return for returning the deposits on verified returned containers.

2. The vending system of claim 1, wherein the reusable containers are reusable rigid containers.

3. The vending system of claim 1, wherein the reusable containers are reusable bags.

4. The vending system of claim 1, wherein the reusable containers are reusable wrapped sleeves.

5. The vending system of claim 1, wherein the items include products.

6. The vending system of claim 1, wherein the items include goods.

7. The vending system of claim 1, wherein the items include liquids.

8. The vending system of claim 1, wherein the items include gases.

9. A system for dispensing items in reusable containers, and for returning deposits when the containers are returned, comprising:

a plurality of reusable containers being selected from one of rigid containers, recyclable bags or recyclable wrapped sleeves;

at least one item packaged in each of the reusable containers;

a plurality of separate transferable weather resistant security tags, each of the separate transferable weather resistant tags being attached to each of the packaged reusable containers;

a plurality of vertically stacked racks wherein each rack supports a track and a belt for storing reusable containers thereon, the tracks and belts being above one another, wherein the system dispenses each of the packaged reusable containers after each transaction, and wherein one track and belt with the packaged reusable containers is emptied and depleted before another track and belt with the packaged reusable containers is started to be emptied and depleted;

a money receiver for receiving a payment for each reusable container and a deposit fee for reusable container, adapted for a consumer providing the payment to the receiver allows for a single packaged reusable container with the attached security tag and the at least one item inside to be dispensed from a dispenser unit;

a recyclable reusable container return unit having a return chamber and a surveillance sensor; and a deposit return unit attached to the reusable container return unit, adapted for the consumer returning the reusable container with security the tag, and without the at least one item is placed in the chamber and the tag is sensed and verified by the surveillance sensor, allows for return of the deposit to the consumer.

10. The system of claim 9, wherein the reusable containers are selected from one of rigid containers, bags and sleeves.

11. The system of claim 9, wherein the at least one item is selected from one of a good or a product.

12. The system of claim 9, wherein the at least one item is selected from one of a liquid or a gas.

* * * * *